(12) United States Patent
Chang et al.

(10) Patent No.: US 7,890,049 B2
(45) Date of Patent: Feb. 15, 2011

(54) RETRANSMISSION APPARATUS AND METHOD IN WIRELESS RELAY COMMUNICATION SYSTEM

(75) Inventors: Young-Bin Chang, Anyang-si (KR);
Jae-Weon Cho, Suwon-si (JP);
Eun-Taek Lim, Suwon-si (KR);
Sung-Jin Lee, Seoul (KR); Mi-Hyun Lee, Seoul (KR); Hyun-Jeong Kang, Seoul (KR); Chang-Yoon Oh, Yongin-si (KR); Cheng Shan, Suwon-si (KR);
Dong-Seek Park, Yongin-si (KR);
Pan-Yuh Joo, Seoul (KR); Joon-Young Choi, Suwon-si (KR); Jae-Hyuk Jang, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 843 days.

(21) Appl. No.: 11/807,685

(22) Filed: May 29, 2007

(65) Prior Publication Data

US 2007/0275656 A1 Nov. 29, 2007

(30) Foreign Application Priority Data

May 29, 2006 (KR) .......................... 2006-0048356

(51) Int. Cl.
*H04B 7/15* (2006.01)
(52) U.S. Cl. .............................. 455/11.1; 455/7; 455/9; 455/13.1; 455/412.1
(58) Field of Classification Search ................ 455/11.1, 455/13.1, 424, 425, 517.7, 12.1, 552.1, 456.5, 455/561, 9, 7; 370/329, 319, 466, 315
See application file for complete search history.

(56) References Cited

U.S. PATENT DOCUMENTS

| 4,882,765 | A | * | 11/1989 | Maxwell et al. ................ 455/18 |
| 5,699,367 | A | | 12/1997 | Haartsen |
| 2004/0010736 | A1 | | 1/2004 | Alapuranen |

(Continued)

FOREIGN PATENT DOCUMENTS

WO   WO 03/069837   8/2003

(Continued)

OTHER PUBLICATIONS

Wiemann et al: "A Novel Multi-Hop ARQ Concept", Vehicular Technology Conference, 2005, May 30, 2005.

(Continued)

*Primary Examiner*—Tan Trinh
(74) *Attorney, Agent, or Firm*—The Farrell Law Firm, LLP

(57) ABSTRACT

Apparatus and method for performing Automatic Retransmission reQuest (ARQ) in a wireless relay communication system are provided, which include performing ARQ with the base station (BS), transmitting data successfully received from the BS to mobile station (MS), and retransmitting corresponding data to the MS when a retransmission indication message is received from the BS. Since the relay station (RS) relays only the errorless data to the receiver, the reliability of the data received at the receiver can be enhanced. The load on the RS can be reduced because the transmitter controls the ARQ.

26 Claims, 21 Drawing Sheets

U.S. PATENT DOCUMENTS

| | | | |
|---|---|---|---|
| 2005/0232183 A1* | 10/2005 | Sartori et al. | 370/319 |
| 2005/0270975 A1* | 12/2005 | Meylan et al. | 370/229 |
| 2007/0275657 A1* | 11/2007 | Chang et al. | 455/9 |
| 2008/0144569 A1* | 6/2008 | Orlassino et al. | 370/329 |
| 2009/0003378 A1* | 1/2009 | Sachs | 370/466 |
| 2009/0092072 A1* | 4/2009 | Imamura et al. | 370/315 |

FOREIGN PATENT DOCUMENTS

| | | |
|---|---|---|
| WO | WO 2005/008947 | 1/2005 |
| WO | WO 2006/024321 | 3/2006 |

OTHER PUBLICATIONS

IEEE Standard for Local and Metropolitan Area Networks, Part 16: Air Interface for Fixed Broadband Wireless Access Systems, IEEE Std 802.16, Oct. 1, 2004.

* cited by examiner

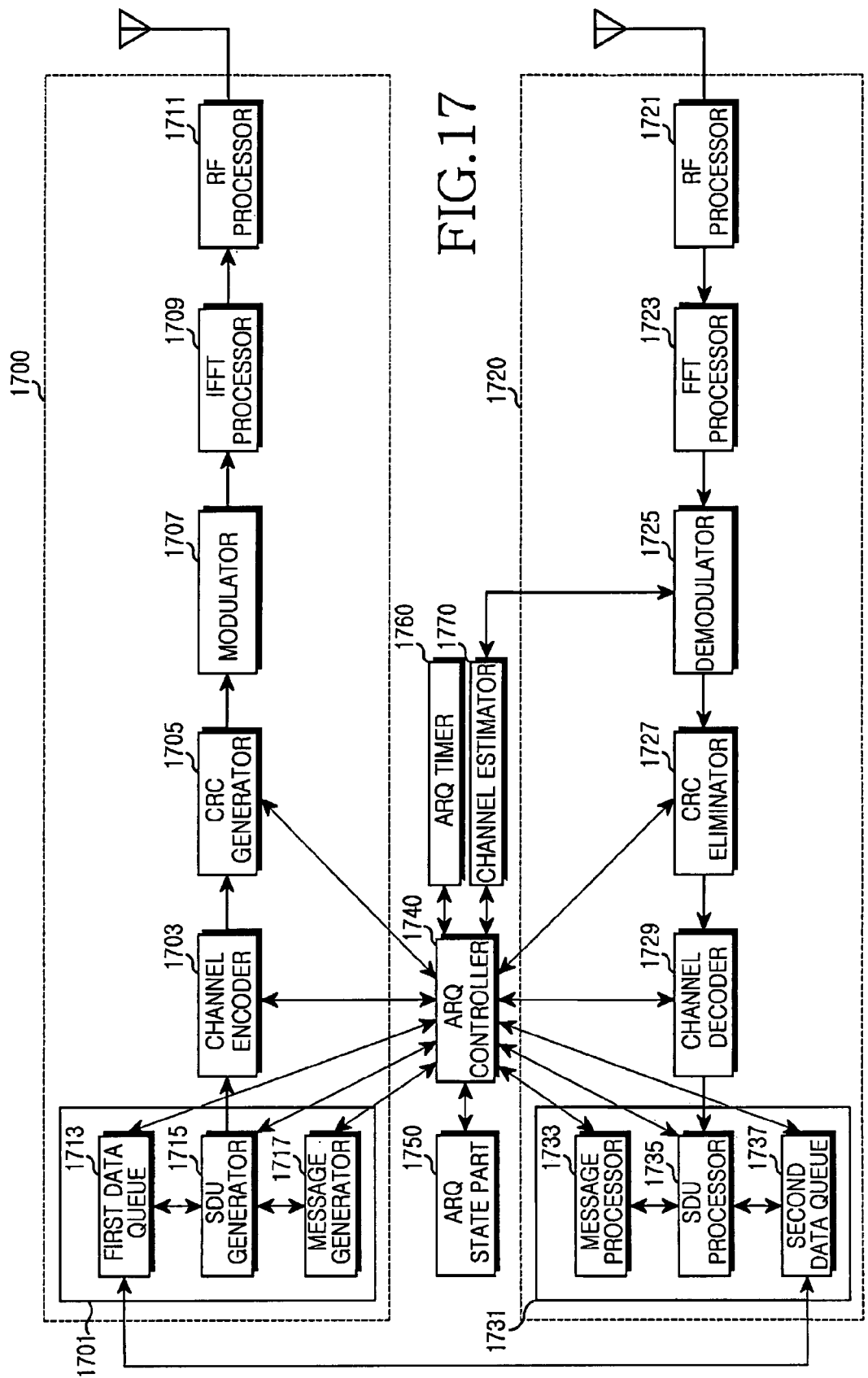

US 7,890,049 B2

RETRANSMISSION APPARATUS AND METHOD IN WIRELESS RELAY COMMUNICATION SYSTEM

PRIORITY

This application claims priority under 35 U.S.C. §119 to an application filed in the Korean Intellectual Property Office on May 29, 2006, entitled "Retransmission Apparatus and Method in Wireless Relay Communication System" and assigned Serial No. 2006-48356, the contents of which are incorporated herein by reference.

BACKGROUND OF THE INVENTION

1. Field of the Invention

The present invention relates generally to an apparatus and method for performing Automatic Retransmission reQuest (ARQ) in a wireless communication system, and in particular, to an apparatus and method for performing ARQ in a multi-hop relay wireless communication system.

2. Description of the Related Art

Wireless data communications are subject to error depending on a channel condition of a radio resource interval. Error control and recovery technologies can be divided largely into Automatic Retransmission reQuest (ARQ) scheme and Frame Error Check (FEC) scheme. ARQ scheme requests retransmission of the errored data to a transmitter. FEC scheme corrects the error of corrupted data.

Particularly, in the ARQ scheme, error check result (e.g., Cyclic Redundancy Check (CRC)) has to be transmitted from a receiver to a transmitter. For instance, when the transmitter initially sends a packet, the receiver decodes the received packet. When the packet is not corrupted, the receiver sends Acknowledgment (ACK) signal to the transmitter. When the packet is corrupted, the receiver sends Negative Acknowledgement (NACK) signal to the transmitter.

Upon receiving the ACK signal, the transmitter sends a new packet. When receiving the NACK signal, the transmitter retransmits the previous packet.

In general, two retransmission schemes are utilized for stable data transfer in the wireless communication system. One is Media Access Control (MAC) ARQ in MAC layer, and the other is Hybrid ARQ (HARQ) in the physical (PHY) layer. In the following, the conventional MAC ARQ scheme is described.

FIG. 1 illustrates a conventional signal exchange procedure according to the ARQ scheme in a wireless communication system using an analog repeater (hereafter, referred to as a repeater).

The conventional wireless communication system includes one or more Base Stations (BSs), one or more repeaters, and one or more terminals. For a better understanding, BS 10, repeater 11, and terminal 12 are shown. It is assumed that two Protocol Data Units (PDUs) of the MAC layer are transmitted from BS 10 to terminal 12, and that terminal 12 receives data via repeater 11.

In FIG. 1, BS 10 generates one physical layer data (PHY DATA 1) with two MAC PDUs and sends it to repeater 11 in step 101. MAC PDU, which is the data transmission unit of the MAC layer, includes MAC header, payload containing real data, and an error check code (e.g., CRC code) for checking error of the payload. PHY DATA includes at least one MAC PDU.

Repeater 11 merely amplifies the amplitude of the PHY DATA 1 signal received from BS 10 and relays the amplified data to terminal 12 in step 103.

Terminal 12 decomposes the MAC PDUs in the PHY DATA 1 received from repeater 11 and checks error with respect to each MAC PDU in step 105. The error is checked using the error check code (CRC code) of the MAC PDU. Terminal 12 generates an error check code with the payload of the received MAC PDU and determines whether there exists error by comparing the generated error check code with the received error check code. In doing so, it is assumed that MAC PDU 2 among the decomposed MAC PDUs is corrupted.

When MAC PDU 1 is errorless and MAC PDU 2 is incorrect among the received data, terminal 12 sends a control message for responding to MAC PDU 1 with ACK and MAC PDU 2 with NACK to repeater 11 in step 107. Repeater 11 amplifies the signal amplitude of the control message received from terminal 12 and relays the amplified message to BS 10 in step 109.

BS 10 recognizes the retransmission-requested MAC PDU by analyzing the control message from repeater 11 in step 109. That is, BS 10 recognizes the retransmission request of MAC PDU 2. Accordingly, BS 10 generates PHY RETRANSMISSION DATA with the retransmission-requested MAC PDU 2 and sends it to repeater 11 in step 11. Repeater 11 amplifies the signal amplitude of PHY RETRANSMISSION DATA from BS 11 and relays the amplified data to terminal 12 in step 113. As such, terminal 12 requests the retransmission of the incorrect data to BS 11 via repeater 11 and receives the retransmission data via repeater 11.

As discussed above, the repeater in the wireless communication system functions to amplify and relay the analog signals transmitted and received between the BS and the terminal. However, since the repeater currently developed has both the MAC layer and the PHY layer, it can interpret messages transceived between the transmitter and receiver. Thus, the mere signal amplification and relay may be quite inefficient. Therefore, what is needed is an ARQ method using an improved repeater in the wireless communication system.

SUMMARY OF THE INVENTION

An aspect of the present invention is to solve at least the above problems and/or disadvantages and to provide at least the advantages below. Accordingly, an aspect of the present invention is to provide an apparatus and method for performing ARQ in a wireless relay communication system.

Another aspect of the present invention is to provide an apparatus and method for performing ARQ under the control of BS in a wireless relay communication system.

The above aspects are achieved by providing a retransmission method of RS in a wireless relay communication system including transmitting data received from a transmitter to a receiver; and retransmitting a corresponding data to the receiver when a retransmission indication message is received from BS.

According to one aspect of the present invention, a retransmission method of an RS in a wireless relay communication system includes transmitting data received from a transmitter to a receiver; checking whether the data sent to the receiver has error by listening to a control message transmitted from the receiver to the transmitter; and retransmitting correct data of the data sent to the receiver to the receiver.

According to another aspect of the present invention, a retransmission method of BS in a wireless relay communication system includes checking whether data sent from an RS to an MS has error or not based on a control message received from the MS; and transmitting a retransmission indication message to the RS with respect to incorrect data of the data sent from the RS to the MS.

According to a further aspect of the present invention, a retransmission method of a BS in a wireless relay communication system includes checking whether data received from the RS has error; and transmitting an indication message to the RS with respect to the incorrect data.

According still to another aspect of the present invention, an RS in a wireless relay communication system includes a checker for checking whether data received from a transmitter is corrupted or not; and a transmission part for transmitting a request message with respect to incorrect data and transmitting errorless data to a receiver.

BRIEF DESCRIPTION OF THE DRAWINGS

The above and other objects, features and advantages of the present invention will become more apparent from the following detailed description when taken in conjunction with the accompanying drawings in which:

FIG. 17 is a block diagram of the RS for the retransmission according to the present invention.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides a technique for performing Automatic Retransmission reQuest (ARQ) in a wireless relay communication system. Herein, the ARQ is Media Access Control (MAC) ARQ applied in MAC layer or Hybrid ARQ applied in physical (PHY) layer.

A relay station (RS) receives data from a transmitter and relays the received data to a receiver. When communication with the transmitter is not smooth, the receiver can receive data from the transmitter using the RS. A plurality of RSs may reside within a cell. A provider can install the RS or a user terminal can function as the RS. The RS is divided into a reception part for receiving a signal from the transmitter and a transmission part for transmitting a signal to the receiver. The transmission part and the receiving part work independently of each other. Yet, it is assumed that data queues of the transmitting part and the receiving part are shared internally.

Figure 1:
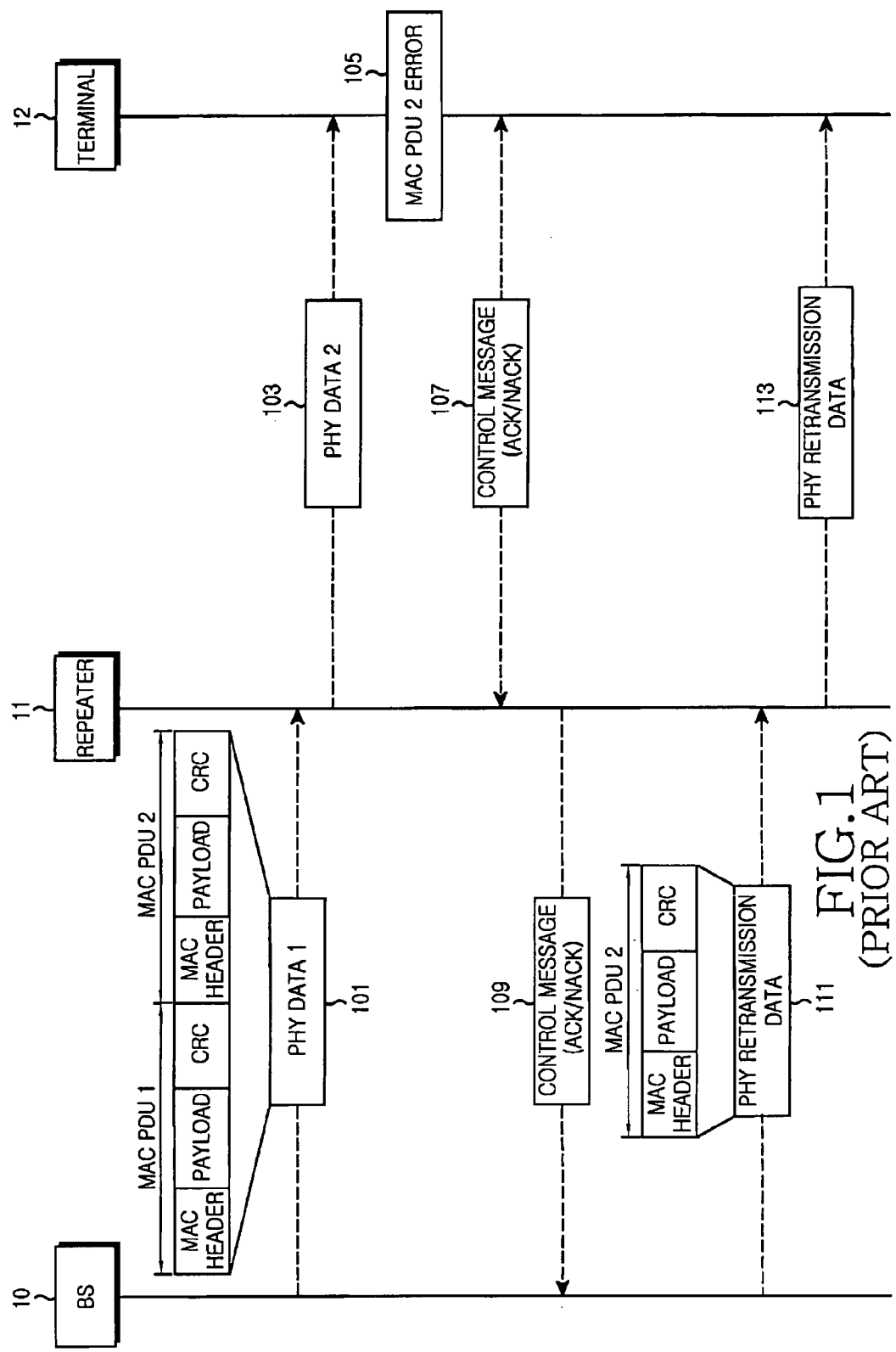
FIG. 1 illustrates a conventional signal exchange procedure according to the ARQ scheme in a conventional wireless communication system using an analog repeater.
Figure 2:
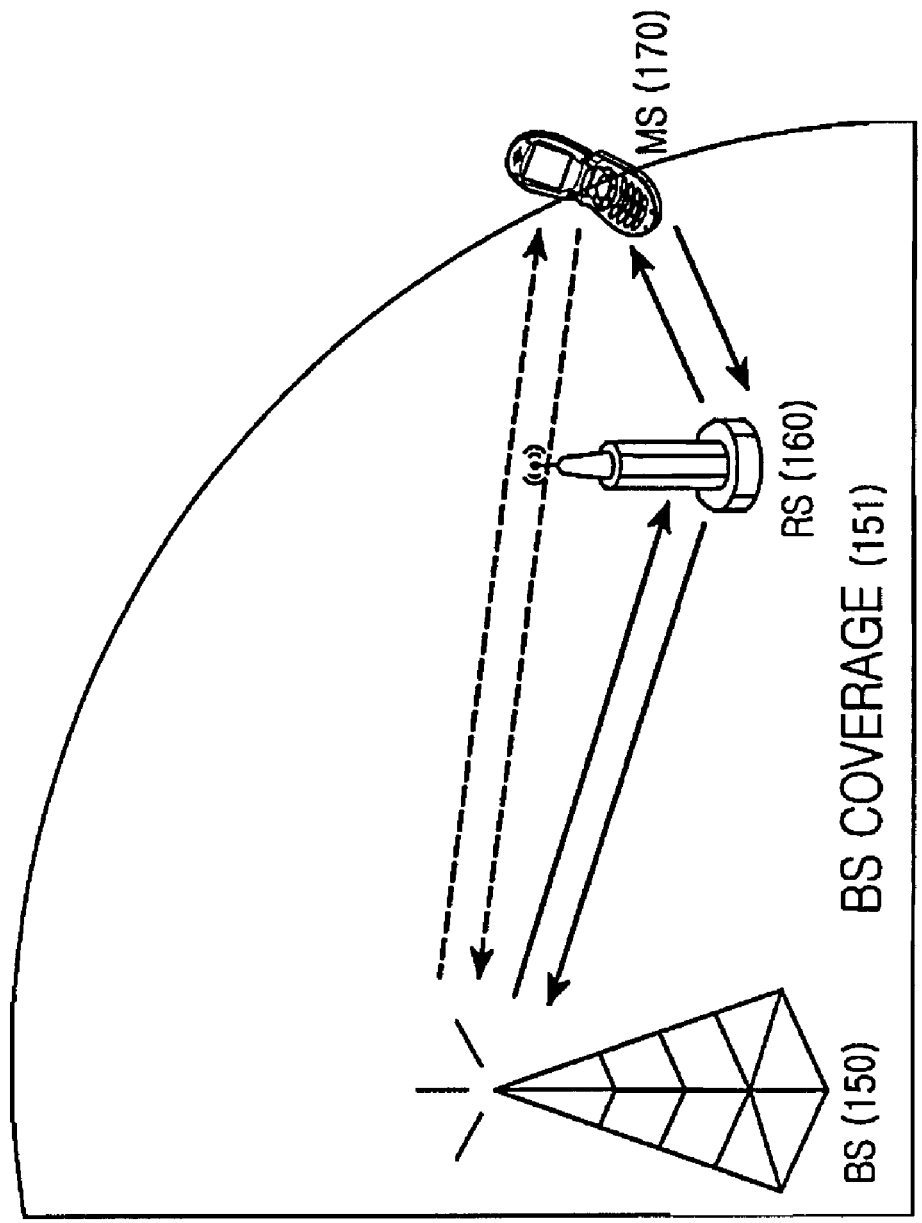
FIG. 2 is a wireless relay communication system according to the present invention.

FIG. 2 illustrates a wireless relay communication system according to the present invention.

In FIG. 2, Mobile Station (MS) 170 belonging to a service coverage 151 of Base Station (BS) 150 receives service in a directional link to BS 150. However, MS 170, which travels on the edge (in the cell boundary) of the service coverage of BS 150, is subject to a poor channel condition and thus cannot provide a high-speed data channel.

Hence, BS 150 provides a high-speed data channel to the MS under the poor channel condition among MSs belonging to service coverage 151 of BS 150 by way of Relay Station (RS) 160. Since MS 170 belongs to service coverage 151 of BS 150, it receives a control signal and a low-speed data channel through the direct link to BS 150. In addition, MS 170 receives a high-speed data channel from BS 150 via RS 160.

Figure 3:
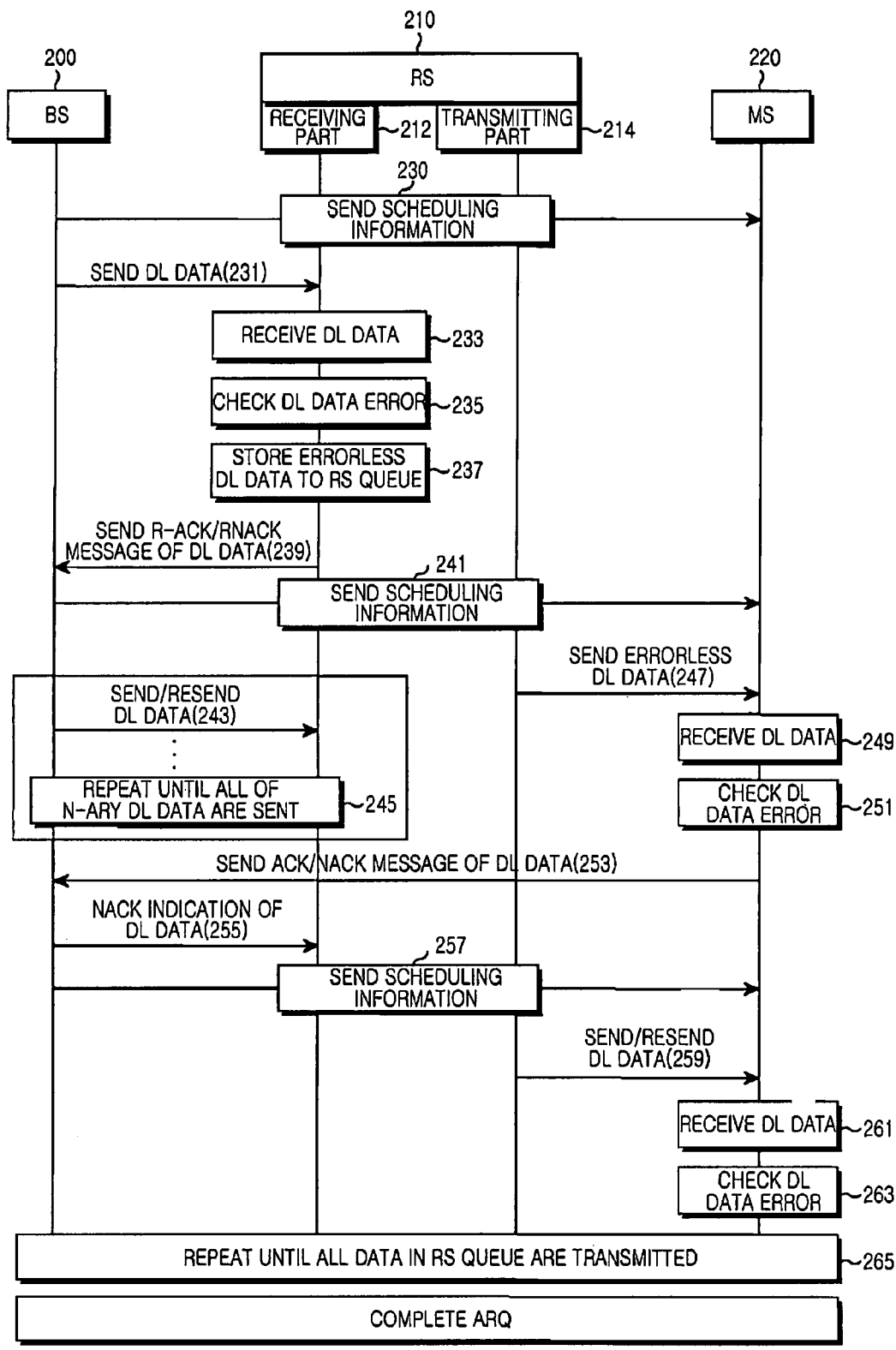
FIG. 3 illustrates a system for retransmitting a downlink (DL) signal in a wireless relay communication system according to the present invention.

FIG. 3 illustrates a system for retransmitting a downlink (DL) signal in a wireless relay communication system according to the present invention. It is assumed that BS 200 has n-ary data to be sent to MS 220, and that BS 200 is able to transmit k-ary data at one time.

BS 200 of FIG. 3 sends schedule information (e.g., DL MAP) for transmitting DL data to RS 210 and MS 220 in step 230. For instance, BS 200 sends the scheduling information to RS 210. Next, RS 210 relays the scheduling information received from BS 200 to MS 220. Alternatively, BS 200 sends the scheduling information to MS 220. In this case, RS 210 can listen to the scheduling information transmitted from BS 200 to MS 220.

In step 231, BS 200 transmits k-ary data of n-ary data to RS 210 according to the scheduling information.

When receiving the data from BS 200 through a receiving part 212 in step 233, RS 210 checks data error using Cyclic Redundancy Check (CRC) code of the data in step 235. If j-ary data are errored among the k-ary data, RS 210 stores (k-j)-ary errorless data to its data queue in step 237. RS 210 does not store the j-ary errored data.

In step 239, RS 210 sends ACK/NACK control message to the BS 210 in response to the received data. Specifically, RS 210 sends ACK control message relating to the correctly received data and NACK control message relating to the incorrect data to BS 200.

The RS can construct the ACK/NACK control message as shown in Table 1.

TABLE 1

| Syntax | Size | Note |
| --- | --- | --- |
| CID | XX bit | RS CID |
| ACK Type | XX bit | ACK type between BS and RS |
| BSN | XX bit | BSN managed between BS and RS |
| ACK MAP | XX bit | ACK bit map in case of selective ACK |
| ... | ... | ... |

The ACK/NACK control message includes Connection ID (CID) of RS which sends the ACK/NACK control message, ACK type for designating a response type, Block Sequence Number (BSN) for designating a sequence number of ARQ block, and ACK MAP for designating reception success or reception failure for each ARQ block when the response type is selective. The CID is RS ID or ID of a specific service provided to the RS. The BS identifies the RS and the service using the CID. The ACK type includes a selective method or a cumulative method. There may be other kinds of ACK type.

BS 200 sends scheduling information (e.g., DL MAP) to RS 210 and MS 220 in step 241. For instance, BS 200 sends the scheduling information to RS 210. Next, RS 210 relays the scheduling information received from BS 200 to MS 220. Alternatively, BS 200 sends the scheduling information to MS 220. In this case, RS 210 can listen to the scheduling information transmitted from BS 200 to MS 220.

A transmission part 214 of RS 210 transmits data in the data queue to MS 220 according to the scheduling information provided from BS 200 in step 247. In other words, RS 210 forwards the data successfully received from BS 200 to MS 220 according to the scheduling information.

Independent of transmission part 214, receiving part 212 of RS 210 receives data or retransmission data from BS 200 in steps 243~245. BS 200 recognizes the j-ary incorrect data from the ACK/NACK control message received from RS 210. Next, BS 200 retransmits the j-ary corrupted data in step 243. In doing so, BS 200 transmits not only the retransmission data but also (k-j)-ary data among (N-k)-ary new data remaining in its data queue to RS 210.

Receiving the data from BS 200, receiving part 212 of RS 210 checks whether the received data is corrupted or not by examining the CRC code of the received data. If the received data is errorless, the data is stored in the data queue. Next, BS 200 and RS 210 repeat the above process until N-ary data stored in the data queue of BS 200 is successfully received at RS 210 in step 245.

When receiving the data from transmitting part 214 of RS 210 in step 249, MS 220 checks the error by examining the CRC code of the data in step 251. If p-ary data of the received data is corrupted, MS 220 sends ACK control message with respect to the errorless data and NACK control message with respect to the incorrect data to BS 220 in step 253. In doing so, MS 220 can transmit the ACK/NACK control message directly to BS 200. Alternatively, MS 220 can transmit the ACK/NACK control message to BS 200 by way of RS 210.

The MS can construct the ACK/NACK control message as shown in Table 2.

TABLE 2

| Syntax | Size | Note |
| --- | --- | --- |
| CID | XX bit | MS CID |
| ACK Type | XX bit | ACK type between BS and MS |
| BSN | XX bit | BSN managed between BS and MS |

TABLE 2-continued

| Syntax | Size | Note |
| --- | --- | --- |
| ACK MAP | XX bit | ACK bit map in case of selective ACK |
| ... | ... | ... |

The ACK/NACK control message includes CID of MS which sends the ACK/NACK control message, ACK type for designating a response type, BSN for designating a sequence number of ARQ block, and ACK MAP for designating reception success or reception failure for each ARQ block when the response type is selective. The CID is MS ID or ID of a specific service provided to the MS. That is, the BS identifies the MS and the service using the CID.

By checking the ACK/NACK control message received from MS 220, BS 200 confirms the incorrect data and the errorless data among the data received at MS 220. Next, BS 200 sends information relating to the incorrect data to RS 210 in step 255. In detail, BS 200 sends NACK indication message containing the information relating to the incorrect data to RS 210.

The BS can construct the NACK indication message as shown in Table 3.

TABLE 3

| Syntax | Size | Note |
| --- | --- | --- |
| CID | XX bit | MS CID |
| Number of BSN | XX bit | the number of data blocks to be retransmitted |
| BSN | XX bit | Nos. of data blocks to be retransmitted |
| ... | ... | ... |

The NACK indication message includes MS service CID to be retransmitted by the RS, the number of ARQ blocks to be retransmitted, and BSN for designating sequence numbers of the retransmitted ARQ blocks.

When performing the ARQ of the MAC layer, the BS sends the NACK indication message constituted as shown in Table 3 to the RS.

When performing the HARQ, the BS generates NACK indication message including MS service CID to be retransmitted by the RS, HARQ Channel ID (ACID) information indicative of a unique number of HAQR data channel to represent unique sequence values of data blocks to be retransmitted, and Sub Packet ID (SPID) indicative of unique numbers of sub data blocks within the ACID, and then sends the generated NACK indication message to the RS.

Next, BS 200 sends scheduling information (e.g., DL MAP) to RS 210 and MS 220 in step 257. For instance, BS 200 sends the scheduling information to RS 210. RS 210 relays the scheduling information provided from BS 200 to MS 220. Alternatively, BS 200 sends the scheduling information to MS 220. In this case, RS 210 can listen to the scheduling information transmitted from BS 200 to MS 220.

RS 210 checks the incorrect data at MS 220 from the NACK indication message provided from BS 200. In step 259, RS 210 retransmits the corrupted data to MS 220 according to the scheduling information provided from BS 200. At this time, RS 210 transmits not only the retransmission data but also new data remaining in its data queue to MS 220.

Upon receiving the data from transmission part 214 of RS 210 in step 261, MS 220 checks whether error occurs by examining the CRC code of the data in step 263. If the received data is incorrect, MS 220 requests the retransmission of the corrupted data to BS 200.

Next, MS 220 repeats the above process until all data in the data queue of RS 210 are received in step 265.

Figure 4:
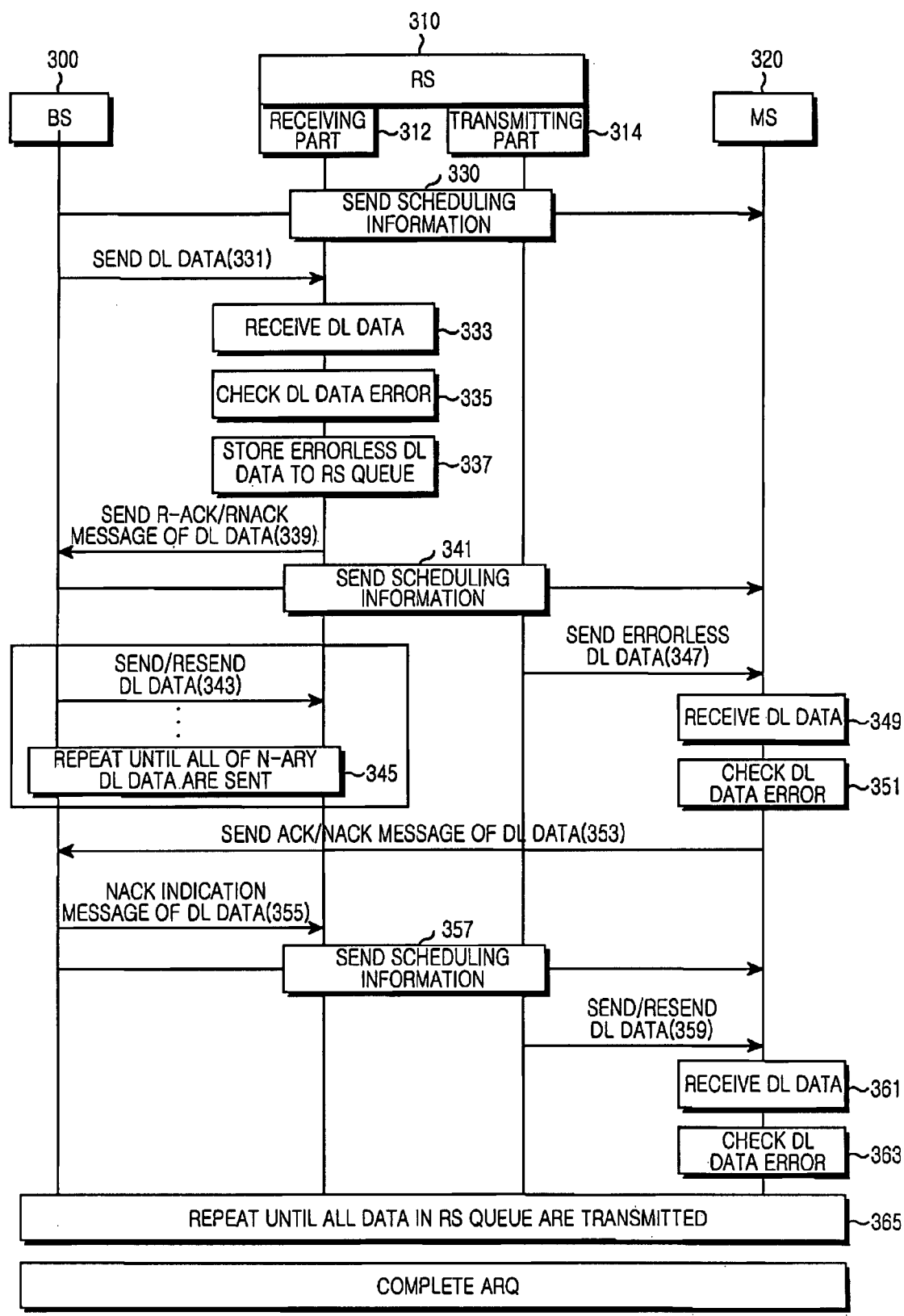
FIG. 4 illustrates a system for retransmitting DL signal in a wireless relay communication system according to the present invention.

FIG. 4 illustrates a system for retransmitting DL signal in a wireless relay communication system according to the present invention. It is assumed that BS 300 has N-ary data to be sent to MS 320 and is capable of transmitting k-ary data at one time.

In FIG. 4, BS 300 sends schedule information (e.g., DL MAP) for transmitting DL data to RS 310 and MS 320 in step 330. For instance, BS 300 sends the scheduling information to RS 310. Next, RS 310 relays the scheduling information received from BS 300 to MS 320. Alternatively, BS 300 sends the scheduling information to MS 320. In this case, RS 310 can listen to the scheduling information transmitted from BS 300 to MS 320.

In step 331, BS 300 transmits k-ary data of N-ary data to RS 310 according to the scheduling information.

When receiving the data from BS 300 through a receiving part 312 in step 333, RS 310 checks data error using CRC code of the data in step 335. If j-ary data are corrupted among the k-ary data, RS 310 stores (k-j)-ary errorless data to its data queue in step 337. RS 310 does not store the j-ary corrupted data.

In step 339, RS 310 sends ACK/NACK control message to BS 310 in response to the received data. Specifically, RS 310 sends ACK control message relating to the correctly received data and NACK control message relating to the errored data to BS 300. RS 310 constitutes the ACK/NACK control message as shown in Table 1 and transmits the generated message to BS 300.

BS 300 sends scheduling information (e.g., DL MAP) to RS 310 and MS 320 in step 341. For instance, BS 300 sends the scheduling information to RS 310. Next, RS 310 relays the scheduling information received from BS 300 to MS 320. Alternatively, BS 300 sends the scheduling information to MS 320. In this case, RS 310 can listen to the scheduling information transmitted from BS 300 to MS 320.

A transmitting part 314 of RS 310 transmits data in the data queue to MS 320 according to the scheduling information provided from BS 300 in step 347. In other words, RS 310 forwards the data successfully received from BS 300 to MS 320 according to the scheduling information.

Independent of the transmitting part 314, a receiving part 312 of RS 310 receives data or retransmission data from BS 300 in steps 343~345. BS 300 recognizes the j-ary corrupted data from the ACK/NACK control message provided from RS 310. Next, BS 300 retransmits the j-ary corrupted data in step 343. In doing so, BS 300 transmits not only the retransmission data but also (k-j)-ary data among (N-k)-ary new data remaining in its data queue to RS 310.

Receiving the data from BS 300, receiving part 312 of RS 310 checks whether the received data is corrupted or not by examining the CRC code of the received data. If the received data is errorless, the data is stored in the data queue. Next, BS 300 and RS 310 repeat the above process until N-ary data stored to the data queue of BS 300 is successfully received at RS 310 in step 345.

When receiving the data from transmitting part 314 of RS 310 in step 349, MS 320 checks the error by examining the CRC code of the data in step 351. If p-ary data of the received data is corrupted, MS 320 sends ACK control message with respect to the errorless data and NACK control message with respect to the errored data to BS 300 in step 353. In doing so, MS 320 can transmit the ACK/NACK control message directly to BS 300. Alternatively, MS 320 can transmit the ACK/NACK control message to BS 300 by way of RS 310. MS 320 can constitute the ACK/NACK control message as shown in Table 2 and transmit it to BS 300.

By checking the ACK/NACK control message received from MS 320, BS 300 confirms the corrupted data and the errorless data among the data received at MS 320. Next, BS 300 sends information relating to whether the data sent from RS 310 to MS 320 is corrupted, to RS 310 in step 355. Specifically, BS 300 sends ACK/NACK indication message containing the information as to the errorless data and the information as to the incorrect data to RS 310. The ACK/NACK indication message from BS 300 can include ACK/NACK information relating to the data as shown in Table 1.

Next, BS 300 sends scheduling information (e.g., DL MAP information) to RS 310 and MS 320 in step 357. For instance, BS 300 sends the scheduling information to RS 310. RS 310 relays the scheduling information provided from BS 300 to MS 320. Alternatively, BS 300 sends the scheduling information to MS 320. In this case, RS 310 can listen to the scheduling information transmitted from BS 300 to MS 320.

RS 310 checks the data corrupted at MS 320 from the ACK/NACK indication message provided from BS 300. In step 359, RS 310 retransmits the corrupted data to MS 320 according to the scheduling information provided from BS 300. At this time, RS 310 transmits not only the retransmission data but also new data remaining in its data queue to MS 320.

When receiving the information as to the data correctly received at MS 320, RS 310 discards the corresponding data from the data queue.

Upon receiving the data from transmitting part 314 of RS 310 in step 361, MS 320 checks whether error occurs by examining the CRC code of the data in step 363. If the received data is corrupted, MS 320 requests the retransmission of the corrupted data to BS 300.

Next, MS 320 repeats the above process until all data in the data queue of RS 310 are received in step 365.

Figure 5:
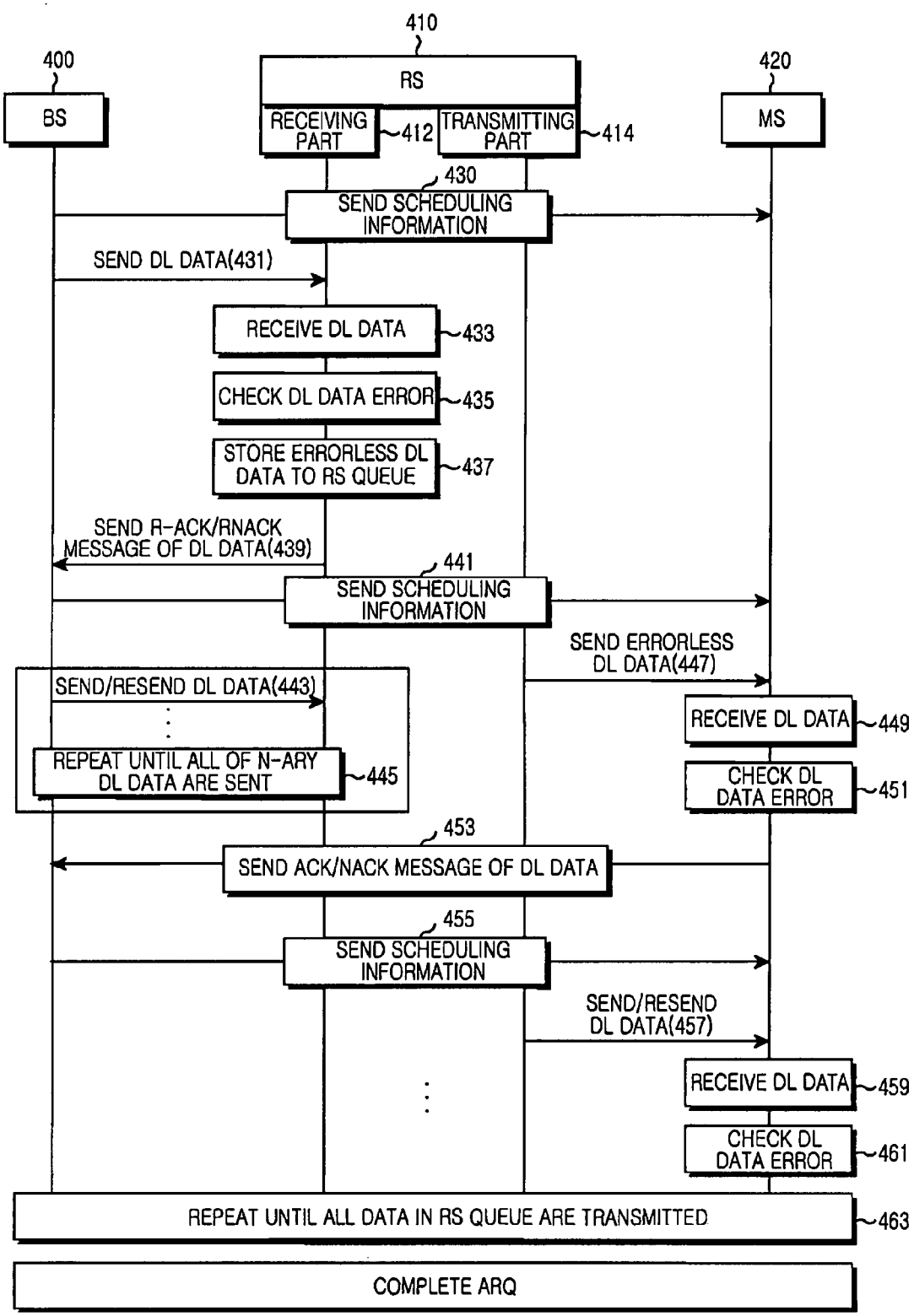
FIG. 5 illustrates a system for retransmitting DL signal in a wireless relay communication system according to the present invention.

FIG. 5 illustrates a system for retransmitting DL signal in a wireless relay communication system according to the present invention. It is assumed that BS 400 has N-ary data to be sent to MS 420 and is able to transmit k-ary data at one time.

In FIG. 5, BS 400 sends schedule information (e.g., DL MAP) for transmitting DL data to RS 410 and MS 420 in step 430. For instance, BS 400 sends the scheduling information to RS 410. Next, RS 410 relays the scheduling information provided from BS 400 to MS 420. Alternatively, BS 400 sends the scheduling information to MS 420. In this case, RS 410 can listen to the scheduling information transmitted from BS 400 to MS 420.

In step 431, BS 400 transmits k-ary data of N-ary data to RS 410 according to the scheduling information.

When receiving the data from BS 400 through a receiving part 412 in step 433, RS 410 checks data error using CRC code of the data in step 435. If j-ary data are incorrect among the k-ary data, RS 410 stores (k-j)-ary errorless data to its data queue in step 437. RS 410 does not store the j-ary corrupted data.

In step 439, RS 410 sends ACK/NACK control message relating to the received data to BS 410. Specifically, RS 410 sends ACK control message relating to the correctly received data and NACK control message relating to the corrupted data to BS 400. RS 410 constitutes the ACK/NACK control message as shown in Table 1 and transmits the generated message to BS 400.

BS 400 sends scheduling information (e.g., DL MAP) to RS 410 and MS 420 in step 441. For instance, BS 400 sends the scheduling information to RS 410. Next, RS 410 relays the scheduling information received from BS 400 to MS 420. Alternatively, BS 400 sends the scheduling information to MS 420. In this case, RS 410 can listen to the scheduling information transmitted from BS 400 to MS 420.

A transmitting part 414 of RS 410 transmits data in the data queue to MS 420 according to the scheduling information provided from BS 400 in step 447. In other words, RS 410 forwards the data successfully received from BS 400 to MS 420 according to the scheduling information.

Independent of transmitting part 414, a receiving part 412 of RS 410 receives data or retransmission data from BS 400 in steps 443~445. BS 400 recognizes the j-ary corrupted data from the ACK/NACK control message provided from RS 410. Next, BS 400 retransmits the j-ary corrupted data in step 443. In doing so, BS 400 transmits not only the retransmission data but also (k-j)-ary data among (N-k)-ary new data remaining in its data queue to RS 410.

Receiving the data from BS 400, receiving part 412 of RS 410 checks whether the received data is corrupted or not by examining the CRC code of the received data. If the received data is errorless, the data is stored to the data queue. Next, BS 400 and RS 410 repeat the above process until N-ary data stored to the data queue of BS 400 is successfully received at RS 410 in step 445.

When receiving the data from transmitting part 414 of RS 410 in step 449, MS 420 checks the error by examining the CRC code of the data in step 451. If p-ary data of the received data is corrupted, MS 420 sends ACK control message with respect to the errorless data and NACK control message with respect to the incorrect data to BS 400 in step 453. In doing so, MS 420 can transmit the ACK/NACK control message to BS 400 by way of RS 410. Alternatively, MS 420 can transmit the ACK/NACK control message directly to BS 400. If MS 420 sends the ACK/NACK control message directly to BS 400, RS 410 can listen to the ACK/NACK control message. Specifically, assuming that RS 410 can determine the radio source (e.g., channel) information allocated to transmit the ACK/NACK control message from MS 420 to BS 400, RS 410 can receive the ACK/NACK control message using the radio resource. The ACK/NACK control message can be constituted as shown in Table 2.

By checking the ACK/NACK control message received from MS 420, BS 400 confirms the corrupted data and the errorless data-among the data received at MS 420.

Next, BS 400 sends scheduling information to RS 410 and MS 420 in step 455. For instance, BS 400 sends the scheduling information to RS 410. RS 410 relays the scheduling information provided from BS 400 to MS 420. Alternatively, BS 400 sends the scheduling information to MS 420. In this case, RS 410 can listen to the scheduling information transmitted from BS 400 to MS 420.

Upon receiving the scheduling information from BS 400, RS 410 retransmits the data corrupted at MS 420 to MS 420 in step 457. At this time, RS 410 transmits not only the retransmission data but also new data remaining in its data queue to MS 420.

Also, upon receiving the scheduling information from BS 400, RS 410 discards the data not corrupted at MS 420 among the data stored in the data queue.

When receiving the data from transmitting part 414 of RS 410 in step 459, MS 420 checks whether error occurs by examining the CRC code of the data in step 461. If the received data is corrupted, MS 420 requests the retransmission of the corrupted data to BS 400.

Next, MS 420 repeats the above process until all data in the data queue of RS 410 are received in step 463.

Figure 6:
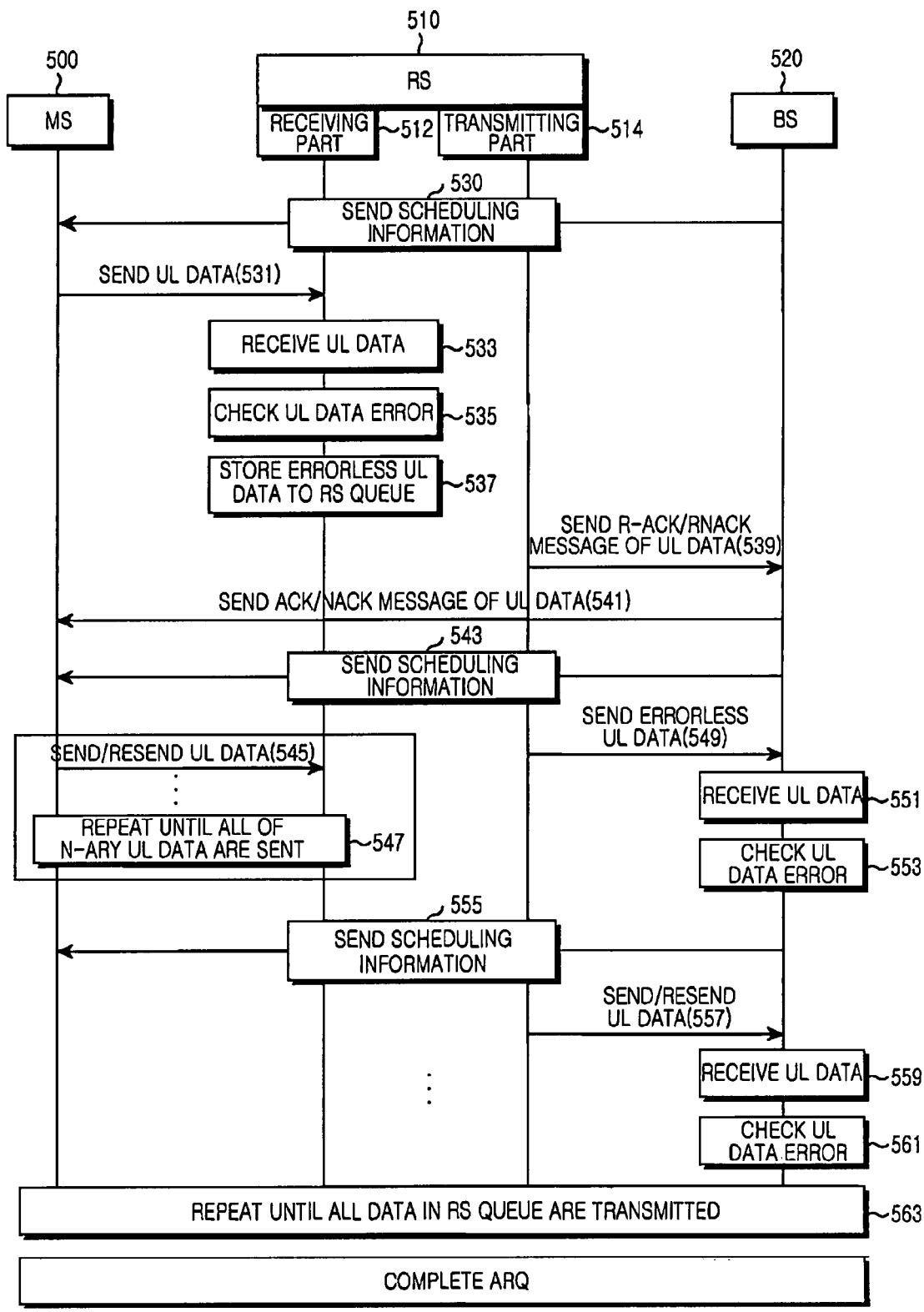
FIG. 6 illustrates a system for retransmitting an uplink (UL) signal in a wireless relay communication system according to the present invention.

FIG. 6 illustrates a system for retransmitting an uplink (UL) signal in a wireless relay communication system according to the present invention. It is assumed that MS 520 has N-ary data to be sent to BS-500 and is able to transmit k-ary data at one time.

In FIG. 6, BS 520 sends schedule information (e.g., UL MAP) for transmitting UL data to RS 510 and MS 500 in step 530. For instance, BS 520 sends the scheduling information to RS 510. Next, RS 510 relays the scheduling information received from BS 520 to MS 500. Alternatively, BS 520 sends the scheduling information to MS 500. In this case, RS 510 can listen to the scheduling information transmitted from BS 520 to the MS 500.

In step 531, MS 500 transmits k-ary data of N-ary data to RS 510 according to the scheduling information.

When receiving the data from MS 500 through a receiving part 512 in step 533, RS 510 checks data error using CRC code of the data in step 535. If j-ary data are corrupted among the k-ary data, RS 510 stores (k-j)-ary errorless data to its data queue in step 537. RS 510 does not store the j-ary corrupted data.

In step 539, RS 510 sends ACK/NACK in response to the received data to BS 520. RS 510 sends the ACK control message relating to the correctly received data and the NACK control message relating to the corrupted data to BS 520. BS 520 forwards the ACK/NACK control message from RS 510 to MS 500 in step 541.

BS 520 sends scheduling information (e.g., UL MAP) to RS 510 and MS 500 in step 543. For instance, BS 520 sends the scheduling information to RS 510. Next, RS 510 relays the scheduling information received from BS 520 to MS 500. Alternatively, BS 520 sends the scheduling information to MS 500. In this case, RS 510 can listen to the scheduling information transmitted from BS 520 to MS 500.

Receiving part 512 of RS 510 receives data or retransmission data from MS 500 in steps 545~547. MS 500 recognizes the j-ary corrupted data among the data sent to RS 510 from the ACK/NACK control message provided from BS 520.

Hence, MS 500 retransmits the j-ary corrupted data to RS 510 according to the scheduling information provided from BS 520 in step 545. In doing so, MS 500 transmits not only the retransmission-data but also (k-j)-ary data among (N-k)-ary new data remaining in its data queue to RS 510.

Receiving part 512 of RS 510 checks whether the data is corrupted by examining CRC code of the data received from MS 500. If the data is correctly received, the data is stored in the data queue of RS 510. Next, MS 500 and RS 510 repeat the above process until N-ary data stored to the data queue of MS 500 are successfully received at RS 510 in step 547.

Independent of the receiving part 512, transmitting part 514 of RS 510 sends the data in the data queue to BS 520 according to the scheduling information provided from BS 520 in step 549. That is, RS 510 transmits the data successfully received from MS 500 to BS 520 based on the scheduling information.

Receiving the data from transmitting part 514 of RS 510 in step 551, BS 520 checks error by examining CRC code of the data in step 553.

In step 555, BS 520 sends scheduling information (e.g., UL MAP) to RS 510 and MS 500. When sending the scheduling information to RS 510, BS 520 adds NACK indication message containing the information as to the corrupted data. Although it is not shown in FIG. 6, if BS 520 does not forward the ACK/NACK control message received from RS 510 to MS 500 in step 541, BS 520 can transmit the scheduling information and the ACK/NACK control message provided from RS 510 to MS 500 in step 555. BS 520 can constitute the ACK/NACK control message from RS 510 as shown in Table 2 and send it to MS 500.

RS 510 confirms the data corrupted at BS 520 based on the scheduling information containing the NACK indication message received from BS 520. Next, RS 510 retransmits the corrupted data to BS 520 according to the scheduling information in step 557. RS 510 sends not only the retransmission data but also new data remaining its data queue to BS 520.

Upon receiving the data from transmitting part 514 of RS 510 in step 559, BS 520 checks error by examining CRC code of the data in step 561. If the received data is corrupted, BS 520 requests retransmission of the corrupted data to RS 510.

BS 520 repeats the above process until all data in the data queue of RS 510 are received in step 563.

Figure 7:
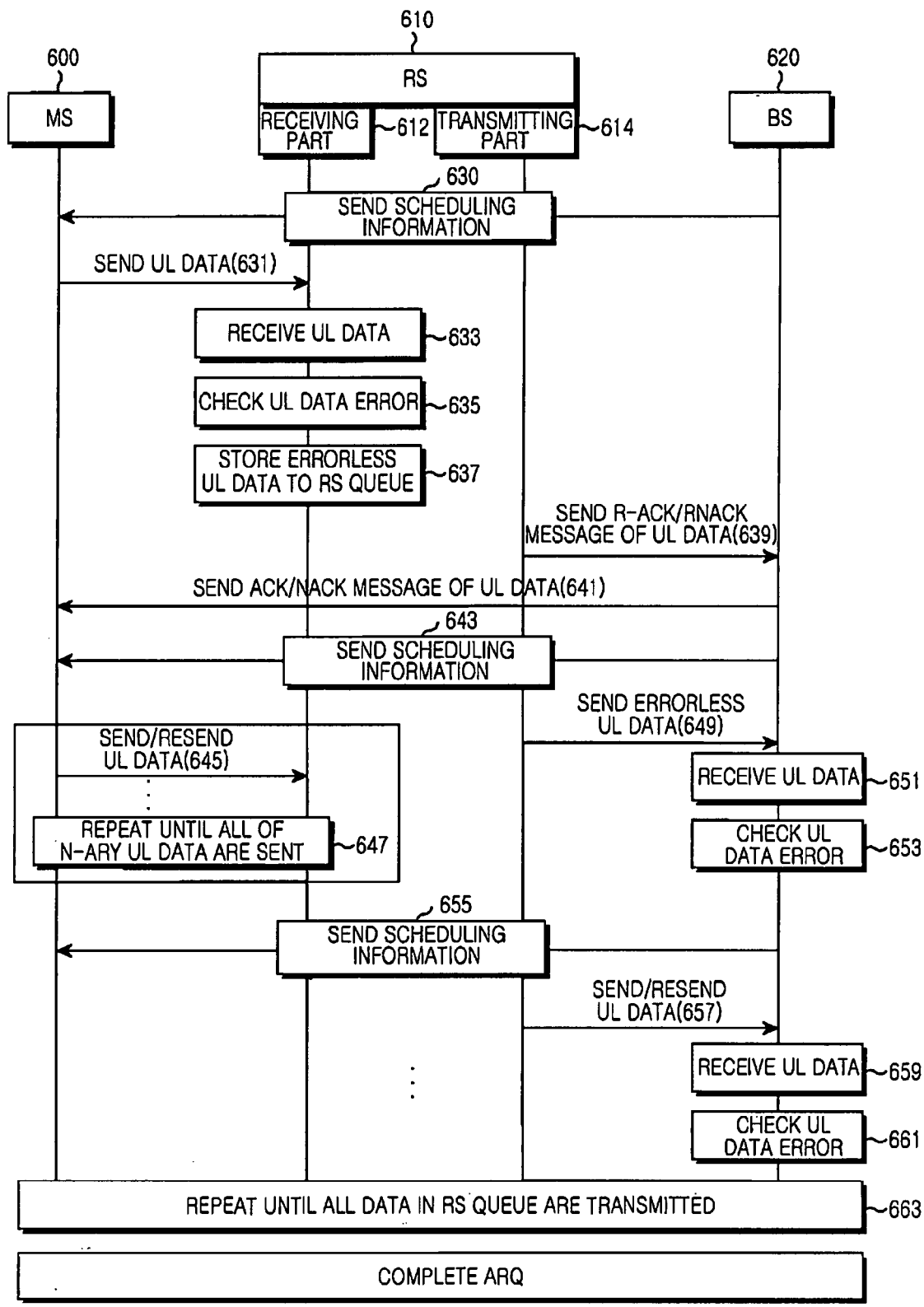
FIG. 7 illustrates a system for retransmitting UL signal in a wireless relay communication system according to the present invention.

FIG. 7 illustrates a system for retransmitting UL signal in a wireless relay communication system according to the present invention. It is assumed that BS 620 has N-ary data to be sent to MS 600 and is able to transmit k-ary data at one time.

In FIG. 7, BS 620 sends schedule information (e.g., UL MAP) for transmitting UL data to RS 610 and MS 600 in step 630. For instance, BS 620 sends the scheduling information to RS 610. Next, RS 610 relays the scheduling information received from BS 620 to MS 600. Alternatively, BS 620 sends the scheduling information to MS 600. In this case, RS 610 can listen to the scheduling information transmitted from BS 620 to MS 600.

In step 631, MS 600 transmits k-ary data of N-ary data to RS 610 according to the scheduling information.

When receiving the data from MS 600 through a receiving part 612 in step 633, RS 610 checks data error using CRC code of the data in step 635. If j-ary data are corrupted among the k-ary data, RS 610 stores (k-j)-ary errorless data to its data queue in step 637. RS 610 does not store the j-ary corrupted data.

In step 639, RS 610 sends ACK/NACK to BS 620 in response to the received data. RS 610 sends the ACK control message relating to the correctly received data and the NACK control message relating to the corrupted data to BS 620. BS 620 forwards the ACK/NACK control message from RS 610 to MS 600 in step 641.

BS 620 sends scheduling information (e.g., UL MAP) to RS 610 and MS 600 in step 643. For instance, BS 620 sends the scheduling information to RS 610. Next, RS 610 relays the scheduling information received from BS 620 to MS 600. Alternatively, BS 620 sends the scheduling information to MS 600. In this case, RS 610 can listen to the scheduling information transmitted from BS 620 to MS 600.

Receiving part 612 of RS 610 receives data or retransmission data from MS 600 in steps 645~647. MS 600 recognizes the j-ary corrupted data among the data sent to RS 610 from the ACK/NACK control message provided from BS 620.

Hence, MS 600 retransmits the j-ary corrupted data to RS 610 according to the scheduling information provided from BS 620 in step 645. In doing so, MS 600 transmits not only the retransmission data but also (k-j)-ary data among (N-k)-ary new data remaining in its data queue to RS 610.

Receiving part 612 of RS 610 checks whether the data is corrupted by examining CRC code of the data received from MS 600. If the data is correctly received, the data is stored to the data queue of RS 610. Next, MS 600 and RS 610 repeat the above process until N-ary data stored to the data queue of MS 600 are successfully received at RS 610 in step 647.

Independent of receiving part 612, transmitting part 614 of RS 610 sends the data in the data queue to BS 620 according to the scheduling information provided from BS 620 in step 649. That is, RS 610 forwards the data successfully received from MS 600 to BS 620 based on the scheduling information.

Receiving the data from transmitting part 614 of RS 610 in step 651, BS 620 checks error by examining CRC code of the data in step 653.

In step 655, BS 620 sends scheduling information (e.g., UL MAP) to RS 610 and MS 600. When sending the scheduling information to RS 610, BS 620 adds ACK/NACK indication message containing the information as to the corrupted data and the information as to the errorless data into the ACK/NACK indication message. Although it is not shown in FIG. 7, if BS 620 does not forward the ACK/NACK control message received from RS 610 to MS 600 in step 641, BS 620 can transmit the scheduling information and the ACK/NACK control message provided from RS 610 to MS 600 in step 655. BS 620 can constitute the ACK/NACK control message of RS 610 as shown in Table 2 and send it to MS 600.

RS 610 confirms the data corrupted at BS 620 based on the scheduling information containing the ACK/NACK indication message received from BS 620. Next, RS 610 retransmits the corrupted data to BS 620 according to the scheduling information in step 657. RS 610 sends the retransmission data together with new data remaining its data queue to BS 620.

Upon receiving the data from transmitting part 614 of RS 610 in step 659, BS 620 checks error by examining CRC code of the data in step 661. If the received data is corrupted, BS 620 requests retransmission of the corrupted data to RS 610.

BS 620 repeats the above process until all data in the data queue of RS 610 are received in step 663.

Figure 8:
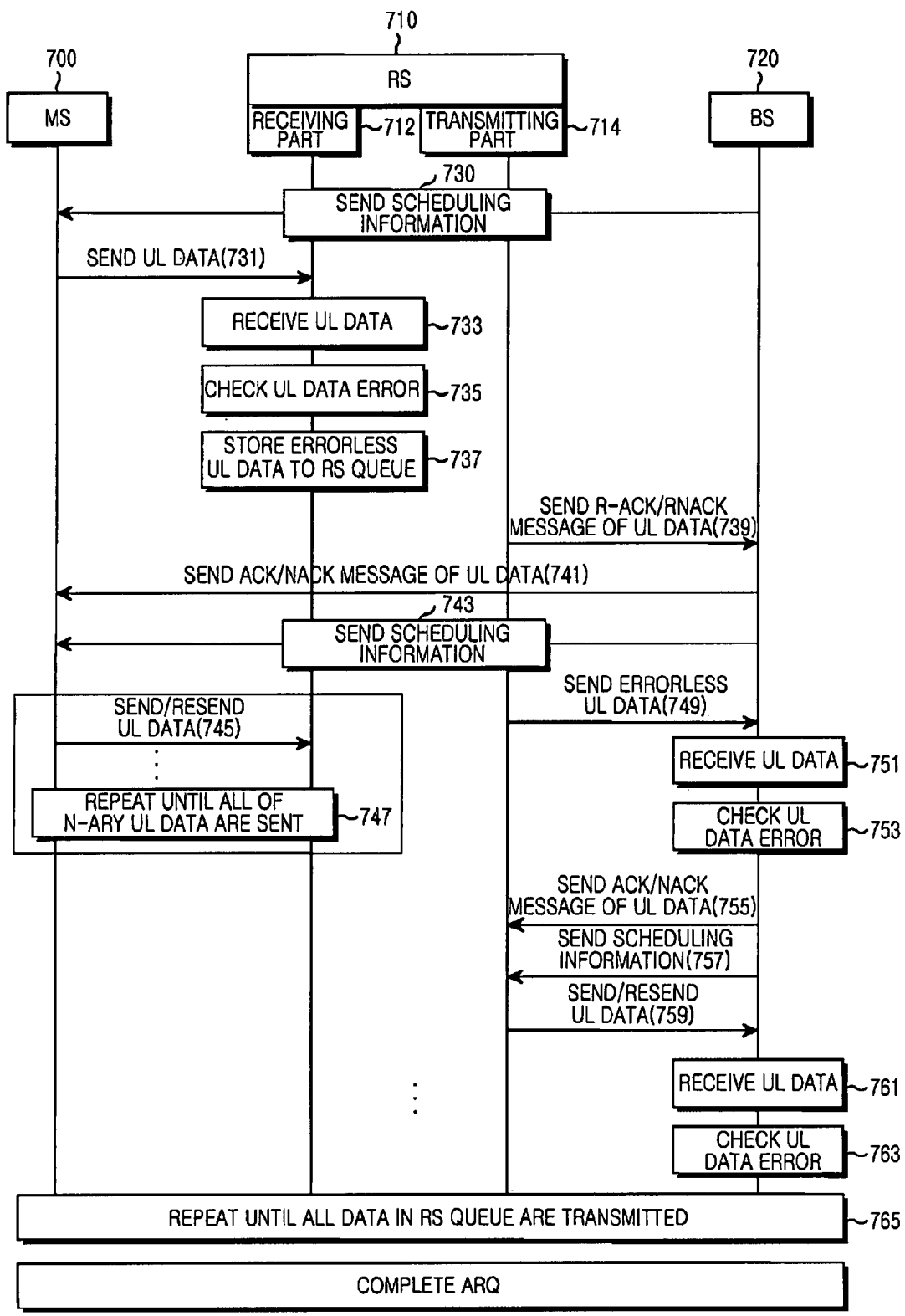
FIG. 8 illustrates a system for retransmitting UL signal in a wireless relay communication system according to the present invention.

FIG. 8 illustrates a system for retransmitting UL signal in a wireless relay communication system according to the present invention. It is assumed that MS 700 has N-ary data to be sent to BS 720 and is able to transmit k-ary data at a time.

In FIG. 8, BS 720 sends schedule information (e.g., UL MAP) for transmitting UL data to RS 710 and MS 700 in step 730. For instance, BS 720 sends the scheduling information to RS 710. Next, RS 710 relays the scheduling information received from BS 720 to MS 700. Alternatively, BS 720 sends the scheduling information to MS 700. In this case, RS 710 can listen to the scheduling information transmitted from BS 720 to MS 700.

In step 731, MS 700 transmits k-ary data of N-ary data to RS 710 according to the scheduling information.

Upon receiving the data from MS 700 at a receiving part 712 in step 733, RS 710 checks data error using CRC code of the data in step 735. If j-ary data are corrupted among the k-ary data, RS 710 stores (k-j)-ary errorless data to its data queue in step 737.

In step 739, RS 710 sends ACK/NACK in relation to the received data to BS 720. In detail, RS 710 sends the ACK control message relating to the correctly received data and the NACK control message relating to the corrupted data to BS 720.

BS 720 sends scheduling information (e.g., UL MAP) to RS 710 and MS 700 in step 743. For instance, when RS 710 sends the ACK control message to BS 720, BS 720 sends ACK control message to MS 700 in step 741. BS 720 also sends data scheduling information to RS 710. RS 710 forwards the data provided from MS 700 to BS 720 according to the data scheduling information. When RS 710 sends the NACK control message to BS 720, BS 720 sends NACK control message to MS 700 in step 741. Also, BS 720 sends scheduling information for the data retransmission to MS 700.

Receiving part 712 of RS 710 receives data or retransmission data from MS 700 in steps 745~747. MS 700 recognizes the j-ary corrupted data among the data sent to RS 710 based on the ACK/NACK control message provided from BS 720.

Hence, MS 700 retransmits the j-ary corrupted data to RS 710 according to the scheduling information provided from BS 720 in step 745.

Receiving part 712 of RS 710 checks whether the data is corrupted by examining CRC code of the data received from MS 700. If the data is correctly received, the data is stored in the data queue of RS 710. When the data is corrupted, RS 710 requests retransmission of the corrupted data to MS 700 via BS 720.

Next, MS 700 and RS 710 repeat the above process until N-ary data stored to the data queue of MS 700 are successfully received at RS 710 in step 747.

Independent of receiving part 712, transmitting part 714 of RS 710 sends the data in the data queue to BS 720 according to the scheduling information provided from BS 720 in step 749. That is, RS 710 forwards the data successfully received from MS 700 to BS 720 based on the scheduling information.

Receiving the data from the transmitting part 714 of RS 710 in step 751, BS 720 checks the error by examining CRC code of the data in step 753.

Assuming that p-ary data of the received data is corrupted, BS 720 sends ACK control message relating to the correctly received data and NACK control message relating to the p-ary errored data to RS 710 in step 755. If BS 720 does not forward the ACK/NACK control message provided from RS 710 to MS 700 in step 741, BS 720 can send the ACK/NACK control message provided from RS 710 to MS 700 in step 755. BS 720 can constitute the ACK/NACK control message as shown in Table 2 and send it to MS 700.

In step 757, BS 720 sends scheduling information (e.g., UL MAP) to RS 710 and MS 700.

RS 710 confirms the corrupted data sent to BS 720 based on the ACK/NACK control message provided from BS 720. Next, RS 710 retransmits the corrupted data to BS 720 according to the scheduling information provided from BS 720 in step 759. RS 710 transmits the retransmission data together with new data remaining in its data queue to BS 720.

Upon receiving the data from transmitting part 714 of RS 710 in step 761, BS 720 checks for errors by examining CRC code of the data in step 763. If the received data is corrupted, BS 720 requests retransmission of the corrupted data to RS 710.

BS 720 repeats the above process until all data in the data queue of RS 710 are received in step 765.

Figure 9A:
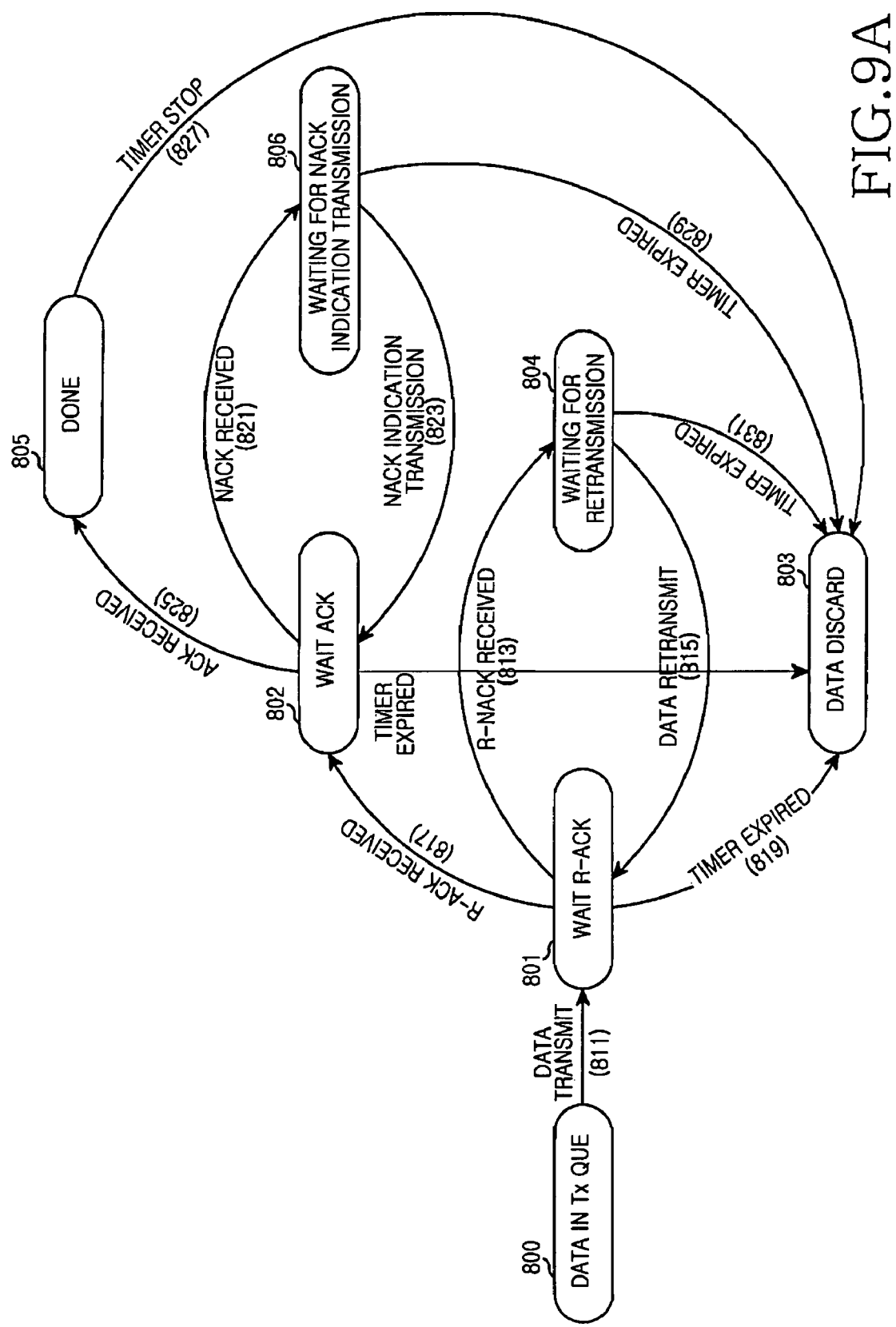
FIGS. 9A to 9C are state transition diagrams of a transmitter according to the present invention.
Figure 9B:
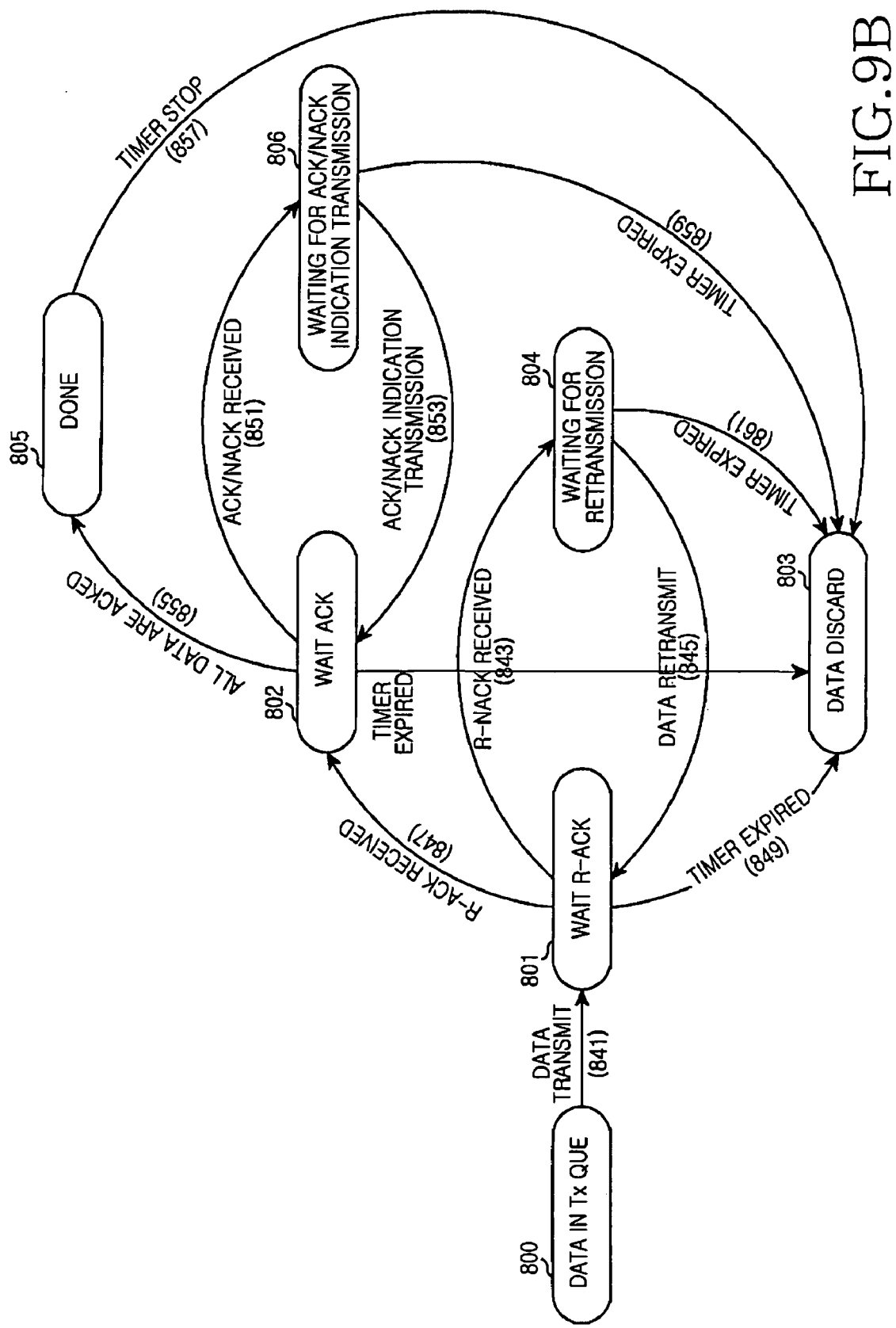
Figure 9C:
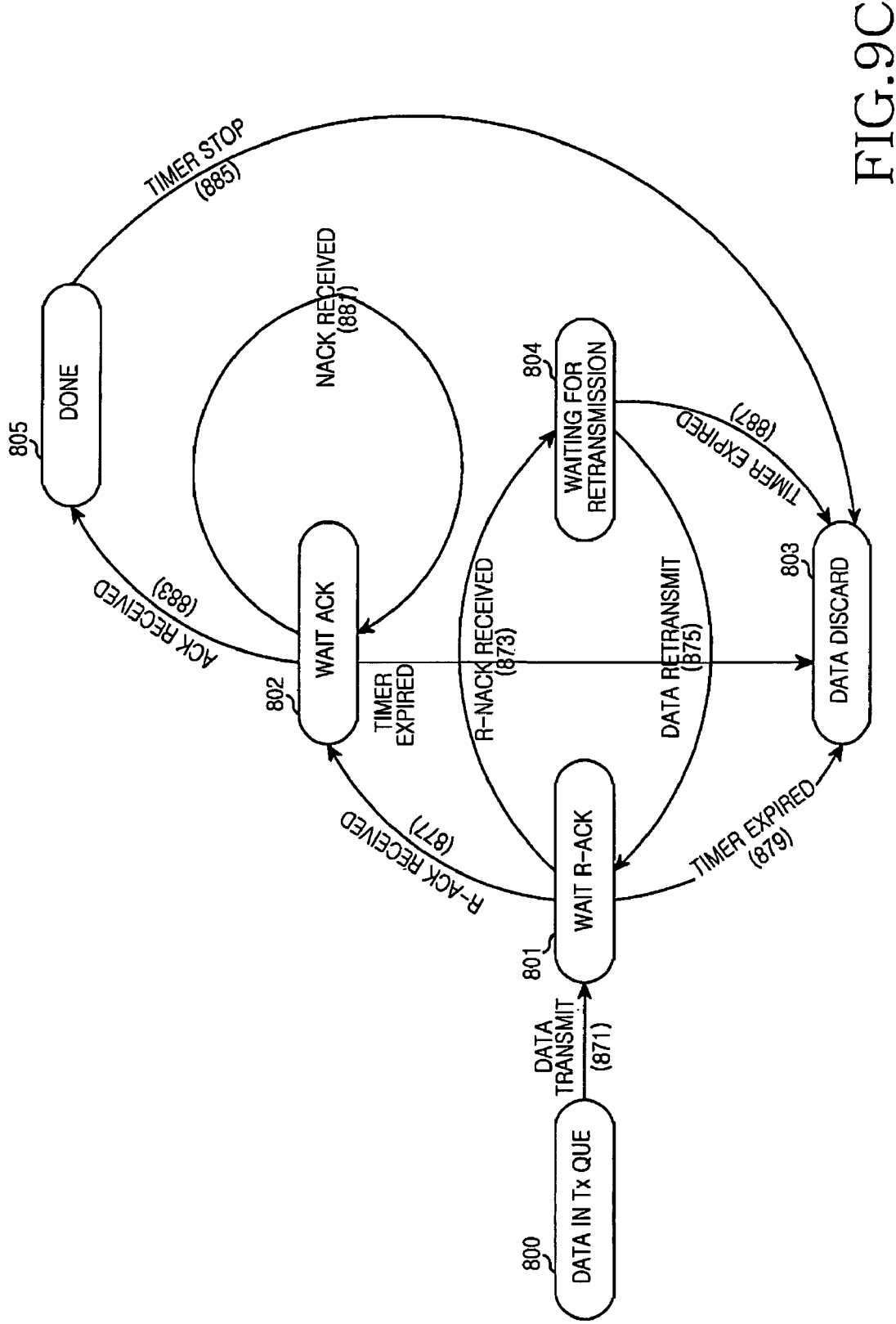

FIGS. 9A to 9C are state transition diagrams of a transmitter according to the present invention. The transmitter represents BS in the DL and MS in the UL. Yet, the following description explains BS in the downlink as an example. ARQ state of the transmitter includes queue storage state (Data in Tx. Que) 800, RS response standby state (Wait R-ACK) 801, receiver response standby state (Wait ACK) 802, discard state (Data Discard) 803, retransmission state (Waiting for Retransmission) 804, complete state (Done) 805, and indication message transmission state 806.

FIG. 9A is the state transition diagram of the transmitter of FIGS. 3 and 6, FIG. 9B is the state transition diagram of the transmitter of FIGS. 4 and 7, and FIG. 9C is the state transition diagram of the transmitter of FIGS. 5 and 8.

Referring first to FIG. 9A, data in Tx. Que 800 indicates that data to be sent from the transmitter to RS is stored in the queue. When data is transmitted to the RS in Data in Tx. Que 800, the transmitter transmits to Wait R-ACK 801 and waits to receive ACK/NACK message from the RS.

When receiving NACK message in relation with part or all of the transmitted data from the RS in Wait R-ACK 801, the transmitter shifts to Waiting for Retransmission 804. After moving to Waiting for Retransmission 804, the transmitter retransmits the retransmission-requested data to the RS and returns to Wait R-ACK 801.

When receiving ACK message in relation with the transmitted data from the RS in Wait R-ACK 801, the transmitter transmits to Wait ACK 802 and waits to receive ACK/NACK message from the receiver. The ACK/NACK message received from the receiver contains information as to whether the data transmitted from the RS to the receiver are corrupted or not.

After receiving ACK message in relation with part or all of the data transmitted by the RS from the receiver in Wait ACK 802, the transmitter transmits to Done 805 and completes the transmission of the successfully sent data. At this time, the transmitter stops a lifetimer with respect to the data transmitted to the receiver.

After completing the data transmission to the receiver, the transmitter transmits to Data Discard 803 and discards the transmitted data from the data queue.

In case that the NACK message is received from the receiver with respect to part or all of the data transmitted by the RS in Wait ACK 802, the transmitter shifts to Waiting for NACK indication transmission 806. Next, the transmitter sends NACK indication message to the RS and returns to Wait ACK 802.

Each data has a lifetimer. When the continual retransmission fails and a preset lifetimer expires, the transmitter shifts to Data Discard 803 and discards the corresponding data from the queue.

In FIG. 9B, data in Tx. Que 800 indicates that data to be sent from the transmitter to the RS is stored in the queue. When data is transmitted to the RS in Data in Tx. Que 800, the transmitter moves to Wait R-ACK 801 and waits to receive ACK/NACK message from the RS.

When receiving NACK message with respect to part or all of the transmitted data from the RS in Wait R-ACK 801, the transmitter shifts to Waiting for Retransmission 804. Next, the transmitter retransmits the retransmission-requested data to the RS and returns to Wait R-ACK 801.

In the mean time, when receiving ACK message in relation with the transmitted data in Wait R-ACK 801, the transmitter moves to Wait ACK 802 and waits to receive ACK/NACK message from the receiver. The ACK/NACK message received from the receiver contains information as to whether the data sent from the RS to the receiver are corrupted or not.

Receiving ACK message from the receiver in relation to all of the data transmitted by the RS in Wait ACK 802, the transmitter shifts to Done 805 and completes the transmission of the successfully received data. At this time, the transmitter stops the lifetimer in relation with the data completely transmitted to the receiver.

Upon completing the data transmission to the receiver, the transmitter shifts to Data Discard 803 and discards the completed data from the data queue.

After receiving NACK message with respect to part or all of the data transmitted by the RS or ACK message with respect to part of the transmitted data from the receiver in Wait ACK 802, the transmitter shifts to Waiting for ACK/NACK indication transmission 806. Next, the transmitter sends ACK/NACK indication message to the RS and goes back to Wait ACK 802. The transmitter shifts from Waiting for ACK/NACK indication transmission to Data Discard 803 to discard the data corresponding to the ACK message among the data sent from the RS to the receiver.

Each data has its lifetimer. Accordingly, when the continual retransmission fails and a preset lifetimer expires, the transmitter transmits to Data Discard 803 and discards the corresponding data from the queue.

In FIG. 9C, data in Tx. Que 800 indicates that data to be sent from the transmitter to the RS is stored in the queue. When data is transmitted to the RS in Data in Tx. Que 800, the transmitter moves to Wait R-ACK 801 and waits to receive ACK/NACK message from the RS.

After receiving NACK message from the RS with respect to part or all of the transmitted data in Wait R-ACK 801, the transmitter shifts to Waiting for Retransmission 804. Next, the transmitter retransmits the retransmission-requested data to the RS and returns to Wait R-ACK 801.

When receiving ACK message with respect to the transmitted data from the RS in Wait R-ACK 801, the transmitter shifts to Wait ACK 802 and waits to receive ACK/NACK message from the receiver. The ACK/NACK message received from the receiver contains information as to whether the data received from the RS to the receiver are corrupted or not.

When receiving the ACK message from the receiver with respect to part or all of the data transmitted by the RS in Wait ACK 802, the transmitter shifts to Done 805 and completes the transmission of the data successfully received at the receiver. In doing so, the transmitter stops the lifetime with respect to the completed transmission of data to the receiver.

Upon completing the data transmission to the receiver, the transmitter moves to Data Discard 803 and discards the completely transmitted data from the queue.

If NACK message is received from the receiver with respect to part or all of the data transmitted by the RS in the Wait ACK 802, the transmitter stays in Wait ACK 802.

Each data block has a life timer. Accordingly, when the continual retransmission fails and a preset life timer expires, the transmitter shifts to Data Discard 803 and discards the corresponding data blocks.

Figure 10:
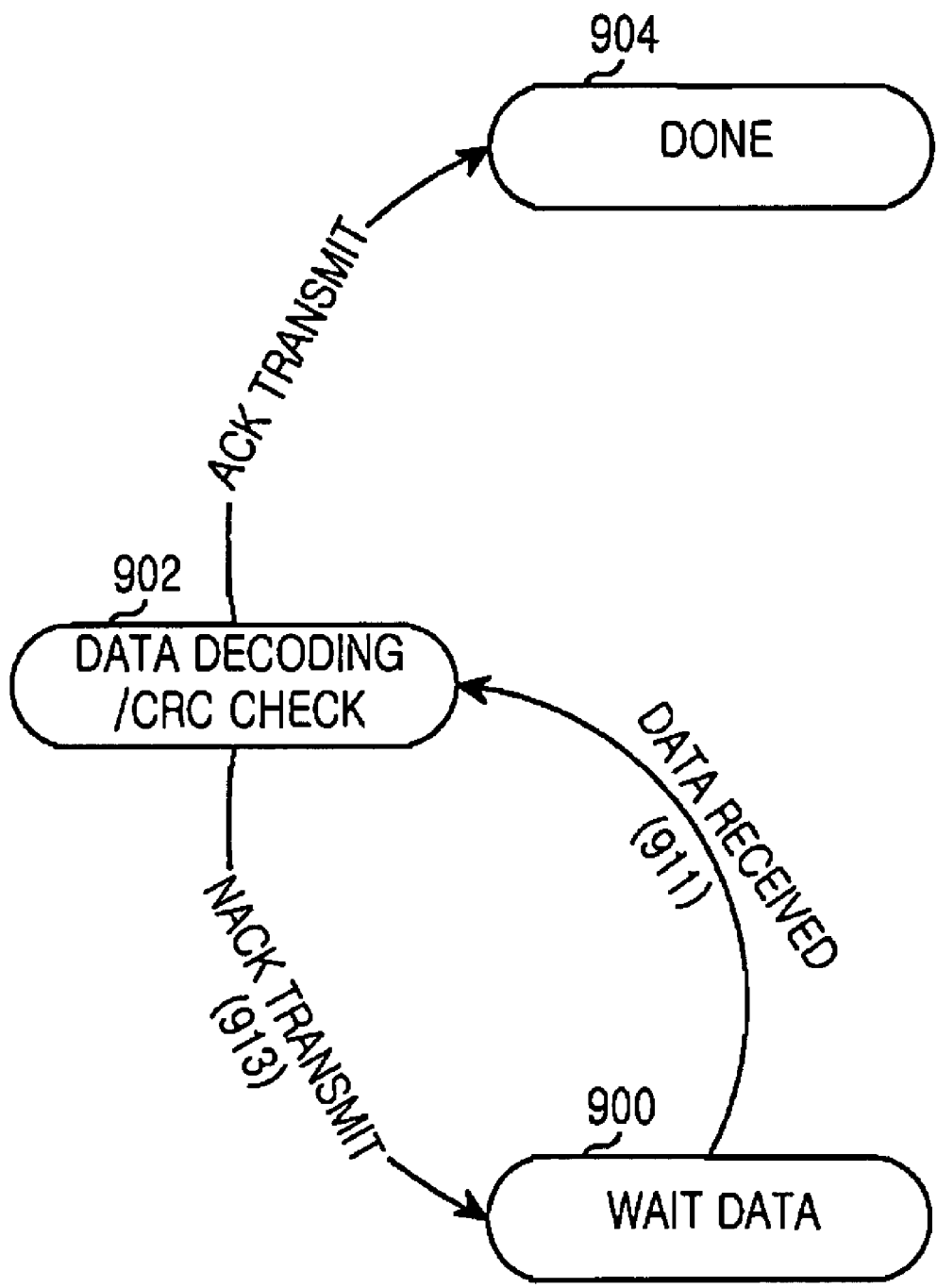
FIG. 10 is a state transition diagram of a receiver according to the present invention.

FIG. 10 is a state transition diagram of a receiver according to the present invention. The receiver is MS in the downlink and BS in the uplink. ARQ state of the receiver includes Wait Data 900, Data Decoding 902, and Done 904.

Wait Data 900 of FIG. 10 is the state for waiting to receive data from RS. Upon receiving data from the RS in Wait Data 900, the receiver shifts to Data Decoding 902 and decodes the received data. In doing so, the receiver determines whether the data is corrupted by checking CRC of the data.

When the data is not corrupted, the receiver transmits ACK message to the transmitter and shifts to Done 904. When part or all of the data is corrupted, the receiver sends NACK message to the transmitter and returns to Wait Data 900.

Figure 11A:
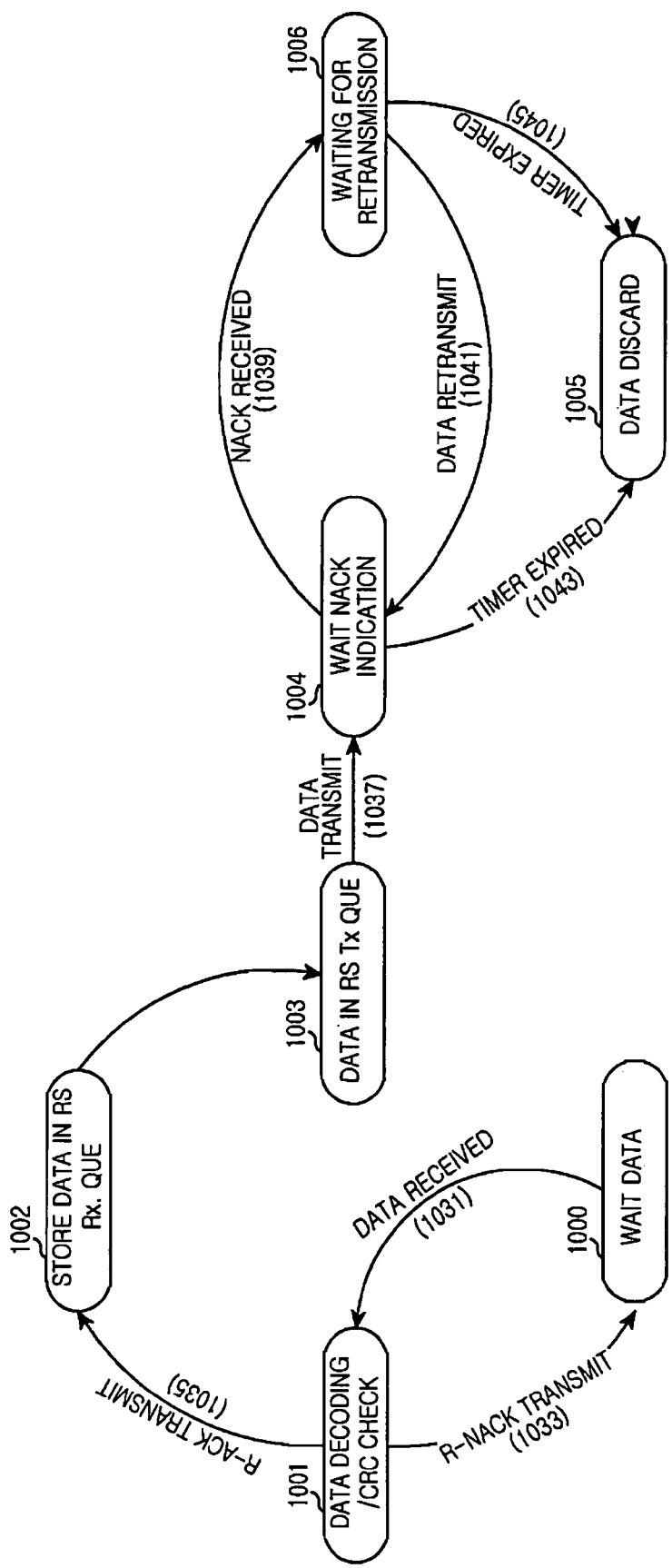
FIGS. 11A to 11C are state transition diagrams of RS according to the present invention.
Figure 11B:
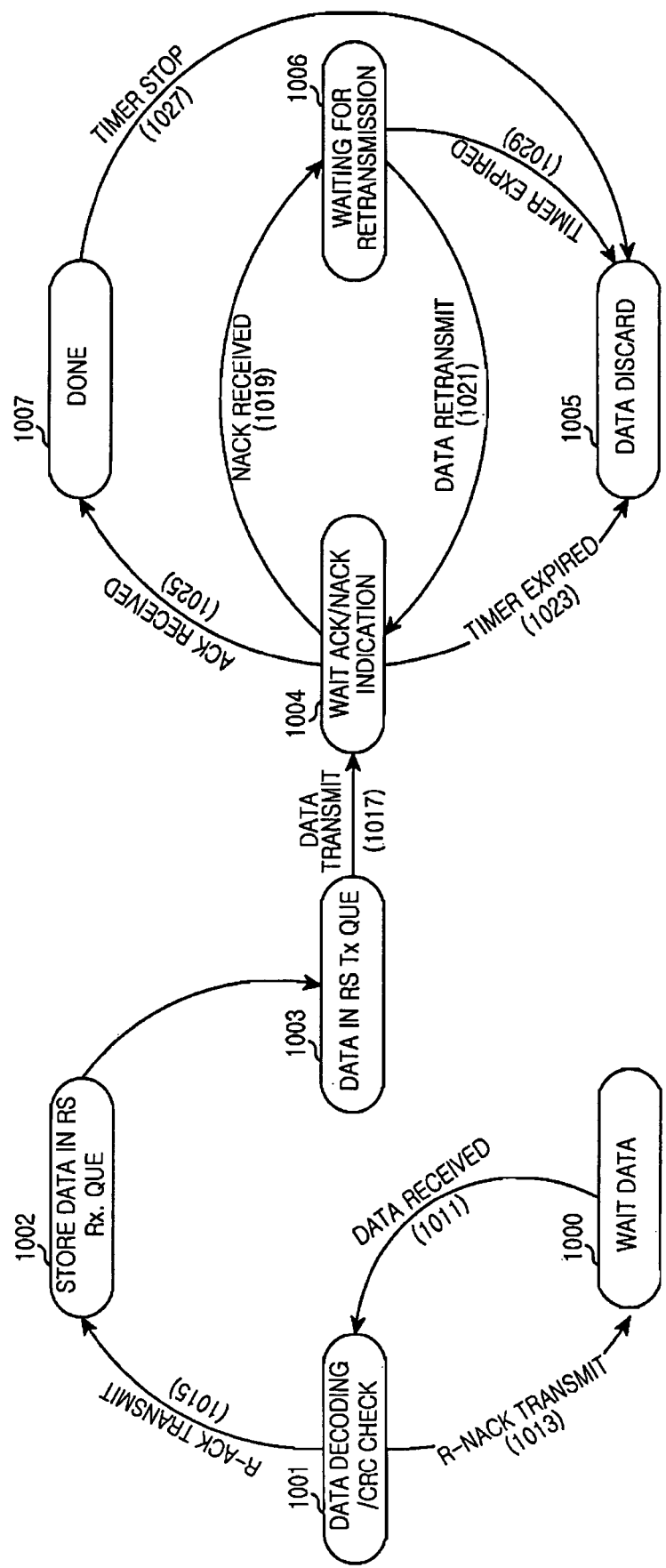
Figure 11C:
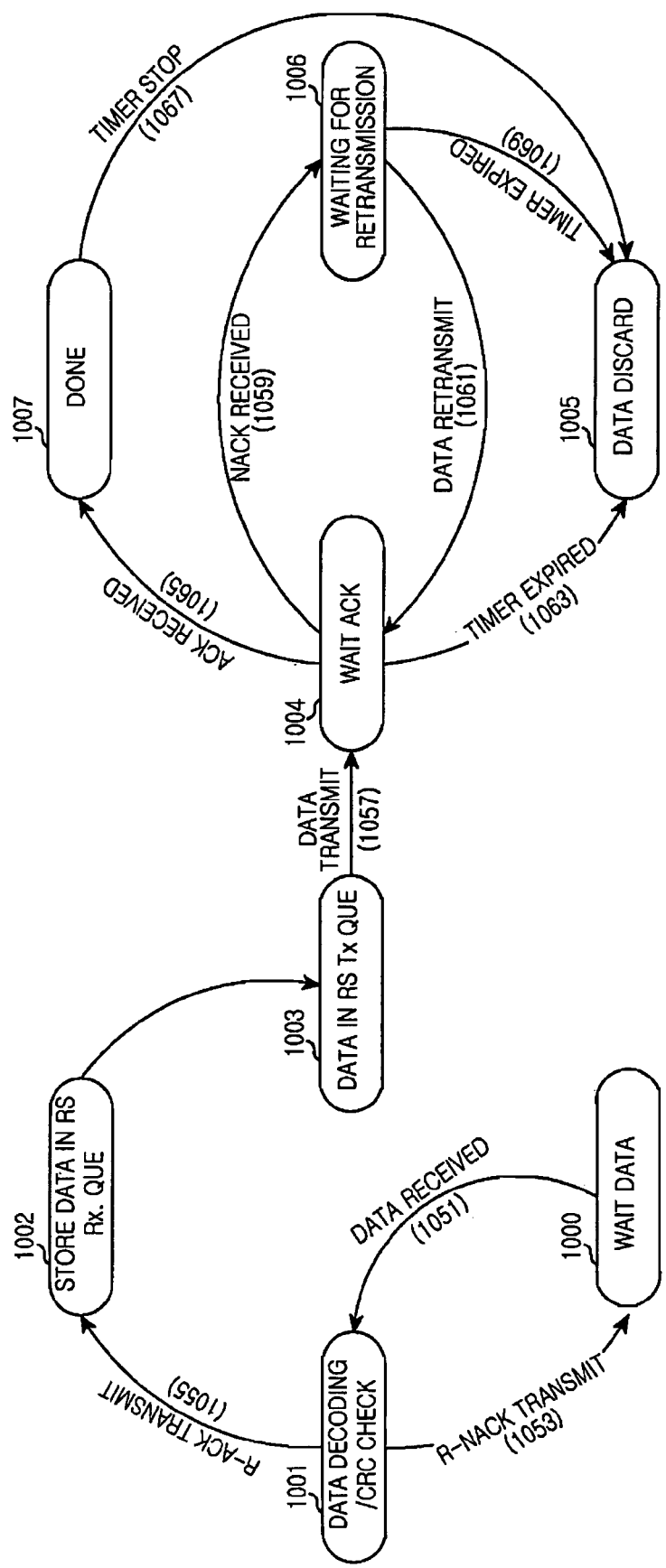

FIGS. 11A to 11C are state transition diagrams of RS according to the present invention. ARQ state of the RS can be divided to Tx mode and Rx mode. Rx mode includes Wait Data 1000, Data Decoding 1001, and Store in RS Rx. Que 1002. Tx mode includes Data in RS Tx. Que 1003, Wait ACK/NACK indication 1004, Data Discard 1005, Waiting for Retransmission 1006, and Done 1007.

FIG. 11A is the state transition diagram of RS of FIGS. 3 and 6, FIG. 11B is the state transition diagram of the RS of FIGS. 4 and 7, and FIG. 11C is the state transition diagram of the RS of FIGS. 5 and 8.

Wait data 1000 in FIG. 11A is the state for waiting to receive data from the transmitter. When receiving data from the transmitter in Wait Data 1000, the RS shifts to Data Decoding 1001 and decodes the received data. In doing so, the RS determines whether the data is corrupted by checking CRC of the data.

When the data is not corrupted, the RS sends ACK message to the BS, shifts to Store Data in RS Rx. Que 1002, and stores the successfully received data to in Rx queue.

When part or all of the data is corrupted, the RS sends NACK message to the BS and returns to Wait Data 1000.

To relay the data stored in the Rx queue to the receiver, the RS duplicates the data to Tx queue and shifts to Data in RS Tx. Que 1003. If the Rx queue and the Tx queue are physically separated, the RS duplicates the data stored to the Rx queue into the Tx queue. If the Rx queue and Tx queue are unified, the RS does not duplicate the data.

After transitioning to Data in RS Tx. Que 1003, the RS sends the data stored to the Tx queue to the receiver and operates a life timer. Next, the RS shifts to Wait NACK indication 1004 and waits to receive NACK indication message from the BS. The NACK indication message received from the BS contains information relevant to the occurrence of error in the data sent from the RS to the receiver.

When receiving NACK indication message from the BS in Wait NACK indication 1004, the RS shifts to Waiting for Retransmission 1006. Next, the RS retransmits data corresponding to the NACK indication message to the receiver and goes back to Wait ACK indication 1004.

The data has a life timer. Accordingly, when continual retransmission fails and a preset life timer expires, the RS shifts to Data Discard 1005 and discards the corresponding data from the queue. As such, the RS retransmits the data to the receiver under the control of the BS.

Wait Data in FIG. 11B is the state for waiting to receive data from the transmitter. Upon receiving data from the transmitter in Wait Data 1000, the RS shifts to Data Decoding 1001 and decodes the received data. In doing so, the RS determines whether the data is corrupted or not by checking CRC of the data.

When the data is correctly received, the RS sends ACK message to the BS, shifts to Store Data in RS Rx. Que 1002, and stores the successfully received data to Rx queue.

When part or all of the data is corrupted, the RS sends NACK message to the BS and returns to Wait Data 1000.

The RS duplicates the data to Tx queue to relay the data stored to Rx queue to the receiver, and then transitions to Data in RS Tx. Que 1003. If the Rx queue and the Tx queue are physically separated, the RS duplicates the data stored to the Rx queue into the Tx queue. If the Rx queue and Tx queue are unified, the RS does not duplicate the data.

After transitioning to Data in RS Tx. Que 1003, the RS sends the data stored to the Tx queue to the receiver and operates a life timer. Next, the RS shifts to Wait ACK/NACK indication 1004 and waits to receive ACK/NACK indication message from the BS. The ACK/NACK indication message received from the BS contains information relevant to the occurrence of error in the data sent from the RS to the receiver.

When receiving ACK indication message from the BS in Wait ACK/NACK indication 1004, the RS shifts to Done 1007 and completes the transmission of the data successfully received at the receiver. In doing so, the RS stops the life timer with respect to the data completely transmitted to the receiver.

When the data transmission to the receiver is completed, the RS shifts to Data Discard 1005 and discards the successfully transmitted data from the queue.

Meanwhile, after receiving NACK indication message from the BS in Wait ACK/NACK indication 1004, the RS shifts to Waiting for Retransmission 1006. Next, the RS retransmits the data blocks corresponding to the NACK indication message to the receiver and goes back to Wait ACK/NACK indication 1004.

Each data has a life timer. Accordingly, when the continual retransmission fails and a preset life timer expires, the RS shifts to Data Discard 1005 and discards the corresponding data from the queue. As such, the RS retransmits data to the receiver under the control of the BS.

Wait Data in FIG. 11C is the state for waiting to receive data from the transmitter. Upon receiving data in Wait Data 1000, the RS moves to Data Decoding 1001 and decodes the received data. In doing so, the RS determines whether the data is corrupted by checking CRC of the data.

When the data is correctly received, the RS sends ACK message to the BS, moves to Store Data in RS Rx. Que 1002, and stores the successfully received data to Rx queue.

When part or all of the data is corrupted, the RS sends NACK message to the BS and returns to Wait Data 1000.

The RS duplicates the data to Tx queue to relay the data stored to the Rx queue to the receiver and then shifts to Data in RS Tx. Que 1003. If the Rx queue and the Tx queue are physically separated, the RS duplicates the data stored to the Rx queue into the Tx queue. If the Rx queue and Tx queue are unified, the RS does not duplicate the data.

After transiting to Data in RS Tx. Que 1003, the RS sends the data stored to the Tx queue to the receiver and operates a life timer. Next, the RS shifts to Wait ACK 1004 and waits to receive ACK/NACK message from the receiver. The ACK/NACK message is ACK/NACK message transmitted from the receiver to the transmitter. At this time, assuming that the RS knows radio resource information for sending ACK/NACK message from the receiver to the transmitter, the RS receives the ACK/NACK message transmitted from the receiver to the transmitter using the resource information.

When receiving the ACK message with respect to the data sent to the receiver in Wait ACK 1004, the RS shifts to Done 1007 and completes the transmission of the successfully received data. The RS stops the life timer in relation with the data.

Upon completing the data transmission to the receiver, the RS moves to Data Discard 1005 and discards the data successfully received at the receiver.

By contrast, when receiving the NACK message in relation to the data sent to the receiver in Wait ACK 1004, the RS transmits to Waiting for Retransmission 1006. Next, the RS, upon receiving MAP message from the BS, retransmits the data corresponding to the NACK message to the receiver and goes back to Wait ACK 1004.

Each data has a life timer. Accordingly, when the continual retransmission fails and a preset life timer expires, the RS shifts to Data Discard 1005 and discards the corresponding data from the queue.

Figure 12:
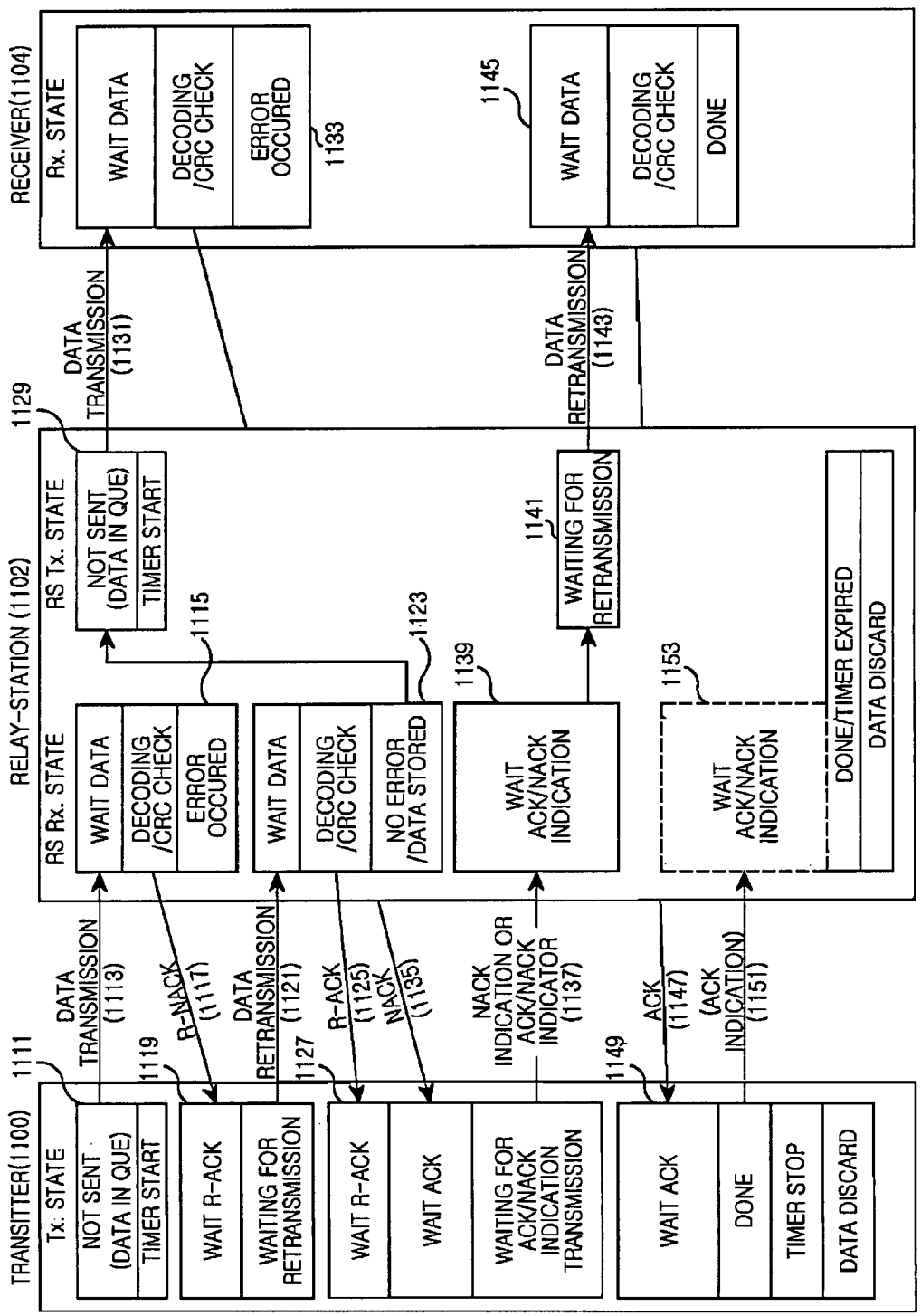
FIG. 12 illustrates a retransmission method in the wireless relay communication system according to the present invention.

FIG. 12 illustrates a retransmission method in the wireless relay communication system according to the present invention and particularly, the wireless communication method for the retransmission using the RS of FIGS. 3 and 4.

Among data stored in the data queue in step 1111, transmitter 1100 of FIG. 12 transmits data to RS 1102 in step 1113. In doing so, transmitter 1100 operates a timer to check a lifetime of the transmitted data.

When receiving the data from transmitter 1100 in the waiting state, RS 1102 decodes the received data and checks whether the data is corrupted using CRC code in step 1115. When the data is corrupted, RS 1102 sends NACK control message to transmitter 1100 in step 1117. Although not shown in FIG. 12, when the data is not corrupted, RS 1102 sends ACK control message to transmitter 1100.

Upon receiving the NACK control message from RS 1102 in step 1119, RS 1102 retransmits the data corresponding to the NACK control message to RS 1102 in step 1121. Transmitter 1100 can send new data stored to the data queue together with the retransmission data to RS 1102.

Receiving the retransmission data from transmitter 1100, RS 1102 decodes the data and checks the error occurrence using CRC code in step 1123. When the data has no error, RS 1102 sends ACK control message to transmitter 1100 in step 1125 and stores the errorless data to the data queue of RS 1102. Although not shown in FIG. 12, when the data is corrupted, RS 1102 sends NACK control message to transmitter 1100.

Receiving the ACK control message from RS 1102, transmitter 1100 waits to receive ACK/NACK control message from receiver 1104 in step 1127.

The transmitting part of RS 1102 sends the data stored in the data queue in step 1127 to receiver 1104 in step 1131. In doing so, RS 1102 operates a timer to check a lifetime of the transmitted data.

Upon receiving the data from RS 1102, the receiver 1104 decodes the data and checks for errors in step 1133.

When the data is found to be incorrect, receiver 1104 sends NACK control message to transmitter 1100 in step 1135.

Receiving the NACK control message from receiver 1104, transmitter 1100 checks whether the data transmitted from RS 1102 to receiver 1104 is corrupted in step 1127.

Next, transmitter 1100 sends information as to whether the data sent from RS 1102 to receiver 1104 is corrupted and ACK/NACK indication message to RS 1102 in step 1137. For instance, transmitter 1100 sends the information relating to the retransmission-requested data and the ACK/NACK indication message to RS 1102 as shown in FIG. 3. Alternatively, the transmitter sends the errorless data and the information relating to the retransmission-requested data to RS 1102 as shown in FIG. 4.

RS 1102 confirms the corrupted data sent to receiver 1104 based on the NACK indication message provided from transmitter 1100. Next, RS 1102 retransmits the corrupted data to receiver 1104 in steps 1139~1143. RS 1102 can send the retransmission data together with new data stored in the data queue to receiver 1104.

After receiving the information as to the errorless data from transmitter 1100, RS 1102 discards the errorless data from the data queue. Specifically, receiving the information as to the errorless data from transmitter 1100 as shown in FIG. 4, RS 1102 discards the errorless data from the data queue; not receiving the information as to the errorless data as shown in FIG. 3, RS 1102 discards the data from the data queue when the timer of the data expires.

Upon receiving the retransmission data from RS 1102, receiver 1104 decodes the data and checks for errors in step 1145. When the data is correctly received, receiver 1104 sends ACK control message to transmitter 1100 in step 1147.

Transmitter 1100, receiving the ACK control message from the receiver, terminates the data transmission, the data retransmission, and the timer operation, and then discards the data sent to RS 1102 and receiver 1104 from the data queue in step 1149.

Figure 13:
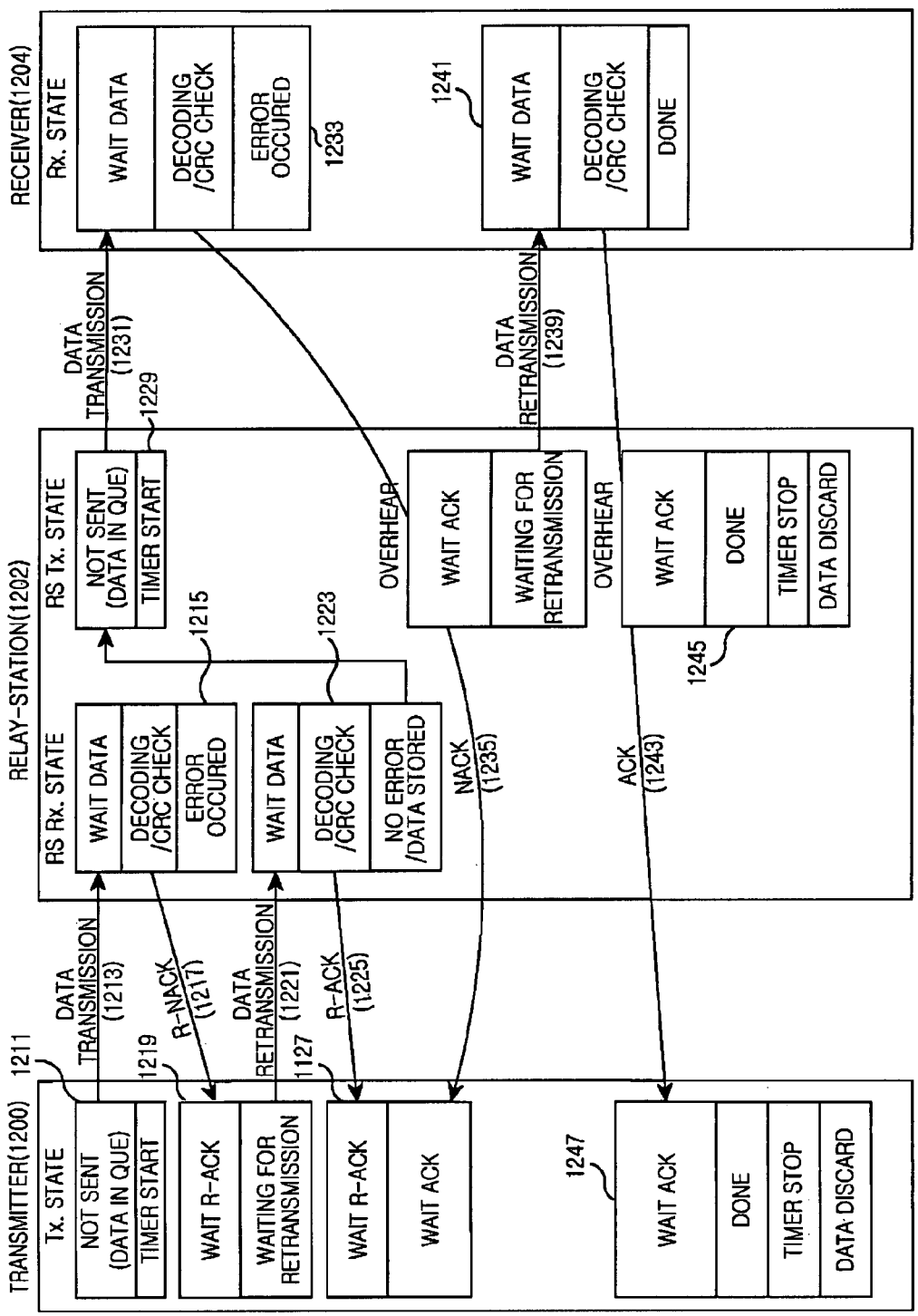
FIG. 13 illustrates a retransmission method in the wireless relay communication system according to the present invention.

FIG. 13 illustrates a retransmission method in the wireless relay communication system according to the present invention and particularly, the wireless communication method for the retransmission using the RS of FIG. 5.

Of data stored in the data queue in step 1211, transmitter 1200 of FIG. 13 sends data transmittable at a time to RS 1202 in step 1213. In doing so, transmitter 1200 operates a timer to check a lifetime of the transmitted data.

Upon receiving the data from transmitter 1200 in the waiting state, RS 1201 decodes the received data and checks the data for errors using CRC code in step 1215. When the data is corrupted, RS 1201 sends NACK control message to transmitter 1200 in step 1217. Although not shown in FIG. 13, when the data is correctly received, RS 1201 sends ACK control message to the transmitter.

Upon receiving the NACK control message from RS 1202 in step 1219, transmitter 1200 retransmits the data corresponding to the NACK control message to RS 1202 in step 1221. In doing so, transmitter 1200 can transmit the retransmission data together with new data stored in the data queue to RS 1202.

Receiving the retransmission data from transmitter 1200, RS 1202 decodes the data and checks the data for errors using the CRC code in step 1223. When the data is correctly received, RS 1202 sends ACK control message to transmitter 1200 in step 1225 and stores the errorless data to its data queue. Although not shown in FIG. 13, when the data is corrupted, RS 1202 sends NACK control message to transmitter 1200.

After receiving the ACK control message from RS 1202, transmitter 1200 waits to receive ACK/NACK control message from receiver 1204 in step 1227.

The transmitting part of RS 1202 sends the data stored in the data queue in step 1229 to receiver 1204 in step 1231. In doing so, RS 1202 operates the timer to check the lifetime of the transmitted data.

Upon receiving the data from RS 1202, receiver 1204 decodes the data and checks for error in step 1233.

When the data is corrupted, receiver 1204 sends NACK control message to transmitter 1200 in step 1235. RS 1202 recognizes the corrupted data transmitted to receiver 1204 by listening to the ACK/NACK control message sent from receiver 1204 to transmitter 1200.

Receiving the NACK control message from receiver 1204, the transmitter 1200 checks whether the data sent from RS 1202 to the receiver 1204 is corrupted or not in step 1227.

Next, RS 1202, upon receiving scheduling information from transmitter 1200, sends the corrupted data of the data received at receiver 1204 to receiver 1204 in steps 1237~1239. RS 1202 can transmit the retransmission data together with new data stored to the data queue to receiver 1204.

When receiving the data from RS 1202, receiver 1204 decodes the data and checks for errors in step 1241. When the data is correctly received, receiver 1204 sends ACK control message to transmitter 1200 in step 1243. In doing so, RS 1202 stops the data transmission, the data retransmission, and the timer operation by listening to the ACK control message sent from receiver 1204 to transmitter 1200. Also, RS 1202 discards the data successfully received at receiver 1204 from the data queue in step 1245.

Upon receiving the ACK control message from receiver 1204, the transmitter stops the data transmission, the data retransmission, and the timer operation. Also, the transmitter 1200 discards the data successfully received at receiver 1204 via RS 1202 from the data queue in step 1247.

Figure 14:
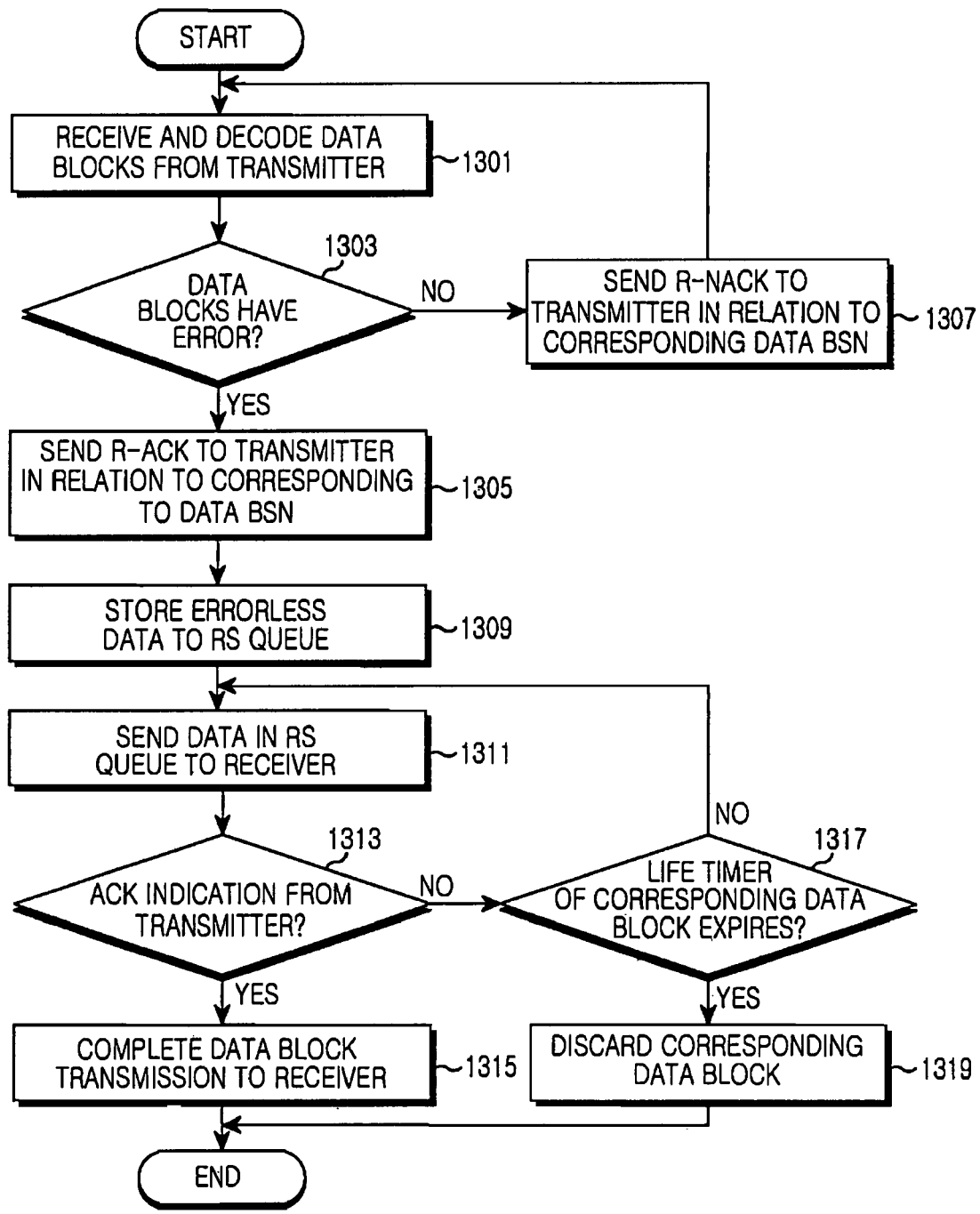
FIG. 14 is a flow chart of retransmission operations of the RS according to the present invention.

FIG. 14 is a flow chart of retransmission operations of the RS according to the present invention.

RS of FIG. 14 receives data from the transmitter and decodes the data in step 1301.

After decoding the data, the RS checks for the occurrence of errors from the CRC code of the decoded data in step 1303.

When the data is corrupted, the RS sends NACK control message relating to the corrupted data to the BS in step 1307. The RS returns to step 1301 and receives retransmission data from the transmitter in response to the NACK control message. For instance, in case of the downlink, the BS retransmits data corresponding to the NACK control message received from the RS to the RS. In case of the uplink, the BS relays the NACK control message provided from the RS to the MS. Next, the MS retransmits the data corresponding to the NACK control message of the RS provided from the BS to the RS.

By contrast, when the data is correctly received, the RS sends ACK control message in relation to the errorless data to the BS in step 1305.

After sending the ACK control message, the RS stores the errorless data in its data queue in step 1309.

In step 1311, the RS sends the data stored in the data queue to the receiver.

After sending the data, the RS checks whether ACK indication message is received from the transmitter in step 1313.

When the ACK indication message is received from the BS, the RS determines the completion of the data transmission to the receiver corresponding to the ACK indication message in step 1315. Thus, the RS terminates the data transmission and the data retransmission. The RS discards the completed data transmission to the receiver from the data queue.

Next, the RS terminates this process.

In contrast, when the NACK indication message is received from the BS, the RS determines the data error corresponding to the NACK indication message and checks whether the lifetime of the data has expired in step 1317.

When the lifetime of the data has not expired, the RS retransmits to the receiver the data corresponding to the NACK indication message in step 1311. In doing so, the RS can transmit the retransmission data together with new data stored in the data queue of the receiver.

When the lifetime of the data has expired, the RS discards the data corresponding to the NACK indication message from the data queue in step 1319.

Next, the RS terminates this process.

Figure 15:
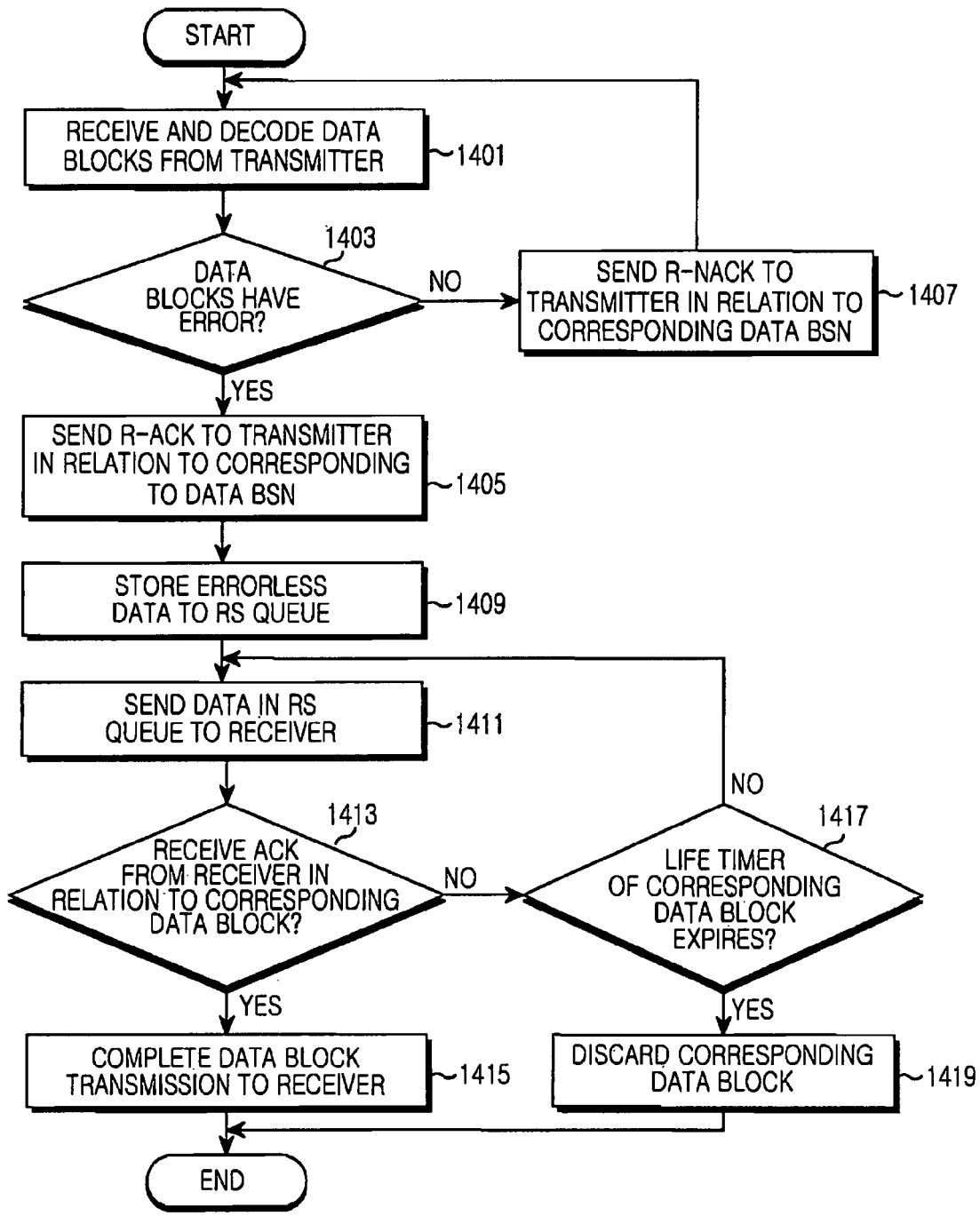
FIG. 15 is a flow chart of retransmission operations of the RS according to the present invention.

FIG. 15 is a flow chart of retransmission operations of the RS according to the present invention.

RS of FIG. 15 receives data from the transmitter and decodes the data in step 1401.

After decoding the data, the RS checks the data for the occurrence of errors from CRC code of the decoded data in step 1403.

When the data is corrupted, the RS sends NACK control message (R-NACK which inferred Relay NACK) in relation to the corrupted data to the BS in step 1407. Next, the RS returns to step 1401 and receives retransmission data from the transmitter in response to the NACK control message. For instance, in case of the downlink, the BS retransmits data corresponding to the NACK control message provided from the RS to the RS. In case of the uplink, the BS relays the NACK control message provided from the RS to the MS. The MS retransmits data corresponding to the NACK control message of the RS provided from the BS to the RS.

When the data is correctly received, the RS sends ACK control message (R-ACK which inferred Relay ACK) to the transmitter in step 1405 and stores the errorless data in its data queue in step 1409.

In step 1411, the RS sends to the receiver the data stored in the data queue.

After sending the data to the receiver, the RS examines the information indicating the occurrence of error in the data by checking whether ACK control message is received from the receiver in step 1413. For instance, in case of the downlink, the RS examines the information indicating the occurrence of error in the data sent to the MS by listening to ACK/NACK control message transmitted from the MS to the BS.

In case of the uplink, the RS examines the information indicating the occurrence of error in the data sent to the BS by receiving ACK/NACK control message from the BS.

Upon receiving the ACK control message from the receiver, the RS determines the completion of the data transmission to the receiver corresponding to the ACK control message in step 1415. Thus, the RS terminates the transmission and the retransmission of the data successfully received at the receiver. Also, the RS discards the data completely transmitted to the receiver from the data queue.

Next, the RS terminates this process.

In contrast, when the NACK control message is received from the receiver, the RS determines the data error corresponding to the NACK control message and checks whether the lifetime of the data has expired in step 1417.

When the lifetime of the data has not expired, the RS retransmits the data corresponding to the NACK control message to the receiver in step 1411. In doing so, the RS can transmit the retransmission data together with new data stored in the data queue to the receiver.

When the lifetime of the data has expired, the RS discards the data corresponding to the NACK control message from the data queue in step 1419.

Next, the RS terminates this process.

Figure 16:
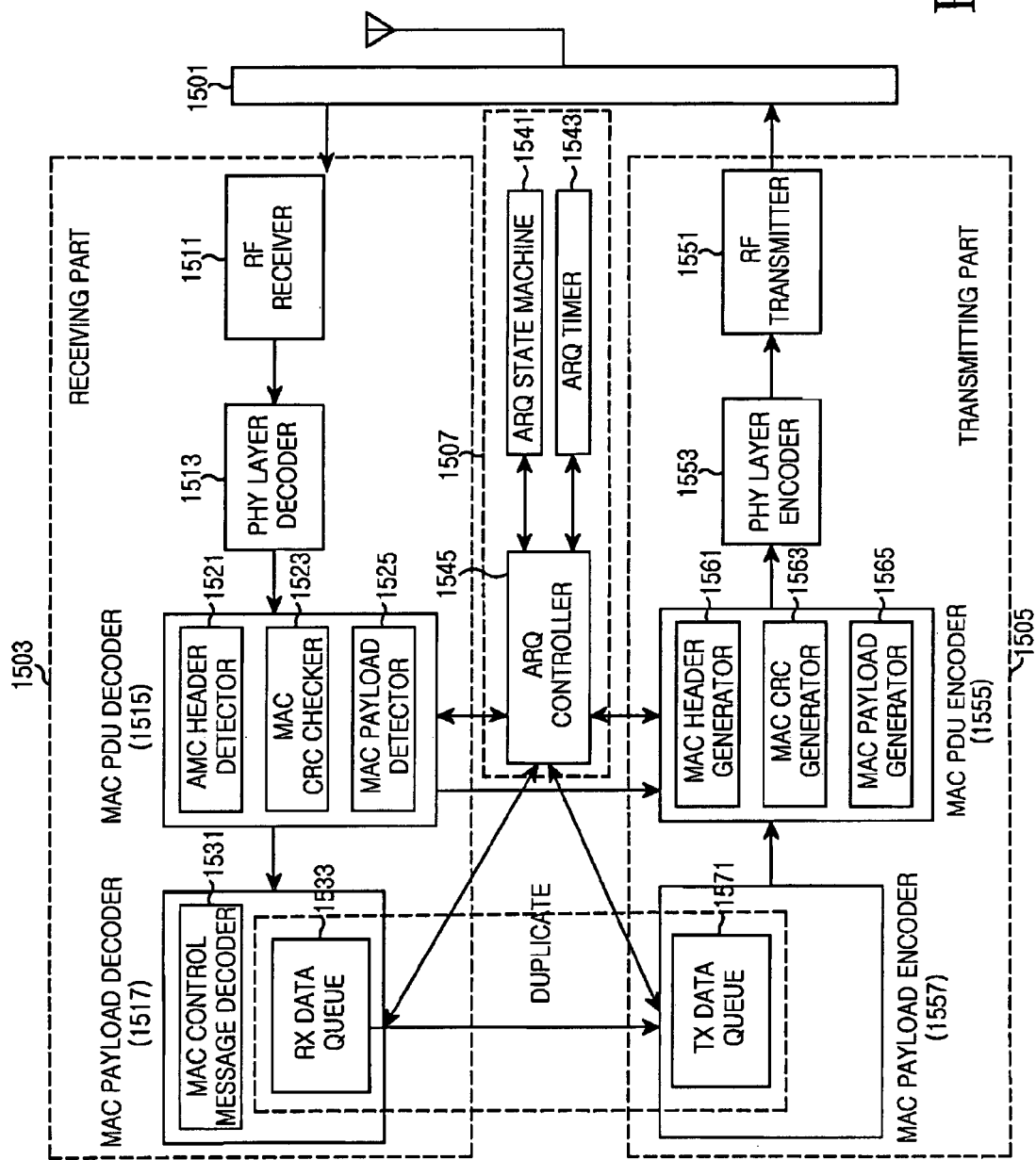
FIG. 16 is a block diagram of the RS for the retransmission according to the present invention.

Now, the structure of the RS for the retransmission is described. FIG. 16 is a block diagram of the RS for performing ARQ of the MAC layer in the wireless communication system, and FIG. 17 is a block diagram of the RS performing HARQ of the PHY layer in the wireless communication system.

FIG. 16 is a block diagram of the RS for the retransmission according to the present invention.

The RS of FIG. 16 includes an antenna part 1501, a receiving part 1503, a transmitting part 1505, and ARQ part 1507.

Antenna part 1501 controls to share a single antenna by receiving part 1503 and transmitting part 1505. There may be two or more receiving parts 1503 and two or more transmitting parts 1505.

Receiving part 1503 includes Radio Frequency (RF) receiver 1511, PHY layer decoder 1513, MAC PDU decoder 1515, and MAC payload decoder 1517.

RF receiver 1511 down-converts a high-frequency signal received from the transmitter through antenna part 1501 to a baseband signal.

PHY layer decoder 1513 interprets PHY layer data in the baseband signal fed from RF receiver 1511.

MAC PDU decoder 1515 analyzes the header of the data fed from PHY layer decoder 1513 and checks whether the data is corrupted. For instance, MAC PDU decoder 1515 includes MAC header detector 1521, MAC CRC checker 1523, and MAC payload detector 1525. MAC header detector 1521 determines whether the payload of the MAC PDU contains control information or traffic by analyzing the header of the MAC PDU fed from PHY layer decoder 1513.

MAC CRC checker 1523 checks for the occurrence of error in the payload of the MAC PDU using the error check code (e.g., CRC) of the MAC PDU. In doing so, MAC CRC checker 1523 reports the error occurrence information of the MAC PDU payload to ARQ part 1505.

MAC payload detector 1525 detects the payload from the MAC PDU. MAC payload detector 1525 detects only the payload, which is errorless at MAC CRC checker 1523, from the MAC PDUs.

When the errorless payload contains control information, MAC PDU decoder 1515 provides the payload to MAC control message decoder 1531 of MAC payload decoder 1517.

When the payload does not contain control information, MAC PDU decoder 151 provides the payload to Rx data queue 1533 of MAC payload decoder 1517.

MAC payload decoder 1517 includes the MAC control message decoder 1531 and the Rx data queue 1533.

MAC control message decoder 1531 interprets the control message contained in the errorless payload of the MAC PDU fed from MAC PDU decoder 1515. MAC control message decoder 1531 reports ARQ related control message such as ACK or NACK in the interpreted control message to ARQ part 1507.

Rx data queue 1533 stores the traffic contained in the errorless payload of the MAC PDU provided from MAC PDU decoder 1515. The data stored in Rx data queue 1533 is duplicated and stored into Tx data queue 1571 under the control of ARQ part 1507. While the Rx data queue 1533 and the Tx data queue 1571 are separately illustrated, they can share a single device.

Transmitting part 1505 includes RF transmitter 1551, PHY layer encoder 1553, MAC PDU encoder 1555, and MAC payload encoder 1557.

MAC payload encoder 1557 generates MAC payload with the data stored to Tx data queue 1571 and outputs the generated MAC payload to MAC PDU encoder 1555. MAC payload encoder 1557 also generates and outputs MAC control message such as ACK/NACK under the control of ARQ part 1507.

MAC PDU encoder 1555 generates the MAC payload fed from the MAC payload encoder 1557 as MAC PDU of the same form as the data received from the transmitter using ACK type or BSN information of the data, which is received from the transmitter and provided from ARQ part 1507. That is, transmitting part 1505 sends the MAC PDU of the same form as in the transmitter to the receiver.

PHY layer encoder 1553 generates PHY layer data with the MAC PDU fed from MAC PDU encoder 1555.

RF transmitter 1551 up-converts the PHY layer data of the baseband fed from PHY layer encoder 1553 to a high-frequency signal and outputs the high-frequency signal.

ARQ part 1507 includes ARQ state machine 1541, ARQ timer 1543, and ARQ controller 1545.

ARQ state machine 1541 manages ARQ state with respect to the retransmitted data. Specifically, ARQ state machine 1541 manages the lifetimer of the transmitted data.

ARQ controller 1545 controls the overall ARQ operation in association with ARQ state machine 1541 and ARQ timer 1543. For instance, when receiving a response message for the MAC PDUs sent to the receiver, ARQ controller 1545 analyzes the response messages and retransmits data corresponding to NACK. ARQ controller 1545 controls to discard data corresponding to ACK from Tx data queue 1571.

Also, ARQ controller 1545 controls the data retransmission of the RS. Specifically, ARQ controller 1545 controls transmitting part 1503 to send ACK/NACK message to the transmitter in relation to the received data. Additionally, upon receiving ACK/NACK indication message from the transmitter, ARQ controller 1545 controls to read and retransmit MAC data corresponding to the NACK indication message and to discard MAC data corresponding to the ACK from the buffer.

FIG. 17 is a block diagram of the RS for the retransmission according to the present invention. Although a transmitting part 1700 and a receiving part 1720 use different antennas, they can use a single antenna.

The RS of FIG. 17 includes transmitting part 1700, receiving part 1720, ARQ controller 1740, ARQ state part 1750, ARQ timer 1760, and a channel estimator 1770

Transmitting part 1700 includes a data generator 1701, a channel encoder 1703, CRC generator 1705, a modulator 1707, Inverse Fast Fourier Transform (IFFT) processor 1709, and RF processor 1711.

Data generator 1701 gathers data stored to a first data queue 1713 and a control message generated at a message generator 1717 at Service Data Unit (SDU) generator 1715 and generates the gathered data as single data for PHY layer transmission. Message generator 1717 generates ACK control message when the data received from the transmitter through receiving part 1720 has no error. By contrast, when the data has error, message generator 1717 generates NACK message.

Channel encoder 1703 codes the data fed from data generator 1701 according to the corresponding modulation level (e.g., Modulation and Coding Scheme (MCS) level). CRC generator 1705 generates CRC code and appends the CRC code to the data fed from channel encoder 1703.

Modulator 1707 modulates and outputs the data fed from CRC generator 1705 according to the corresponding modulation level (e.g, MCS level).

IFFT processor 1709 processes the frequency-domain data provided from modulator 1707 and converts it to a time-domain signal.

RF processor 1711 up-converts the baseband signal fed from IFFT processor 1709 to a RF signal and outputs the RF signal to the transmitter or the receiver over the antenna. For instance, RF processor 1711 transmits ACK/NACK control message in relation to the data received from the transmitter to the BS. Also, RF processor 1711 forwards the data provided from the transmitter to the receiver.

Receiving part 1720 includes RF processor 1721, FFT processor 1723, a demodulator 1725, CRC eliminator 1727, a channel decoder 1729, and a data processor 1731.

RF processor 1721 down-coverts the RF signal received from the transmitter over an antenna to a baseband signal.

FFT processor 1723 processes the time-domain signal fed from RF processor 1721 and converts it to a frequency-domain signal.

Demodulator 1725 demodulates and outputs the signal fed from FFT processor 1723 according to a corresponding modulation level. Demodulator 1725 outputs the demodulated signal to CRC eliminator 1727 and channel estimator 1770.

CRC eliminator 1727 determines whether the signal has errors by checking the CRC code of the signal provided from demodulator 1725. CRC eliminator 1727 eliminates the CRC code from the signal fed from demodulator 1725.

Channel decoder 1729 decodes and outputs the errorless signal provided from CRC eliminator 1727 according to a corresponding modulation level.

SDU processor 1735 of data processor 1731 separates data and control message from the PHY layer signal provided from channel decoder 1729. Next, SDU processor 1735 provides and stores the data in a second data queue 1737. SDU processor 1735 provides the control message to a message processor 1733 to decode and confirm it. While first data queue 1713 and second data queue 1727 are separately illustrated, they can be constituted as a single data queue.

Message processor 1733 decodes ACK/NACK indication message received from the BS and informs ARQ controller 1740. That is, message processor 1733 informs ARQ controller 1740 of information relating to the retransmission-requested data from the BS.

Message processor 1733 listens to ACK/NACK control message from the receiver to the transmitter and provides ARQ controller 1740 with ACK/NACK information relating to the data sent to the receiver.

ARQ state part 1750 manages ARQ state in relation to the retransmitted data. ARQ timer 1760 manages the lifetime for the retransmission of the RS.

ARQ controller 1740 controls overall ARQ operation of the RS in association with ARQ state part 1750 and ARQ timer 1760. For instance, upon receiving ACK/NACK indication message information from message processor 1733, ARQ controller 1740 discards data corresponding to the ACK indication message from first data queue 1713 according to the ACK/NACK indication message information. ARQ controller 1740 controls data generator 1701, channel encoder 1703, and CRC generator 1705 to retransmit to the receiver data corresponding to the NACK indication message.

As another example, upon receiving the listened ACK/NACK control message information from message processor 1733, ARQ controller 1740 controls data generator 1701, channel encoder 1703, and CRC generator 1705 to retransmit to the receiver data corresponding to the NACK control message according to the scheduling information provided from the BS.

When a lifetime expiration message is received from ARQ timer 1760 in the process of the retransmission, ARQ controller 1740 stops the retransmission of the corresponding data.

While the wireless communication system provides the relay service using the single RS as above, a multihop relay wireless communication system can work the same.

As set forth above, since the wireless communication system including RS with the MAC layer and the PHY layer performs the ARQ, the RS merely relays the errorless data to the receiver. Therefore, the reliability of the data received at the receiver can be enhanced. The load on the RS can be reduced because the BS controls the ARQ.

While the invention has been shown and described with reference to certain preferred embodiments thereof, it will be understood by those skilled in the art that various changes in form and details may be made therein without departing from the spirit and scope of the invention as further defined by the appended claims.

What is claimed is:

1. A retransmission method for a Relay Station (RS) in a wireless relay communication system, the method comprising:
   receiving data from a Base Station (BS)
   storing the data if the RS receives the data correctly;
   transmitting the data to a Mobile Station (MS) according to scheduling by the BS;
   receiving scheduling information from the BS in order to retransmit the data when the BS receives a NACK indication message directly from the MS; and
   retransmitting the data to the MS according to the scheduling information.

2. The retransmission method of claim 1, further comprising
   transmitting to the BS a reception success message for the correctly received data.

3. The retransmission method of claim 1, further comprising
   requesting retransmission of incorrect data to the BS.

4. The retransmission method of claim 3, wherein requesting the retransmission to the BS comprises:
   generating a retransmission request message including at least one of a Connection IDentifier (CID) of the RS, Acknowledgement (ACK) type between the BS and the RS, Block Sequence Number (BSN) between the BS and the RS, and ACK MAP information; and
   transmitting the retransmission request message to the BS.

5. The retransmission method of claim 1, wherein the scheduling information received from the BS is a MAP message or a control message.

6. The retransmission method of claim 1, wherein the scheduling information received from the BS includes at least one of a CID of the MS and BSN information for the retransmission.

7. The retransmission method of claim 1, wherein retransmitting the data to the MS comprises:
discarding data corresponding to an ACK indication message when an ACK/NACK indication message is received from the BS; and
retransmitting data corresponding to the NACK indication message to the MS according to scheduling by the BS.

8. The retransmission method of claim 7, wherein the ACK/NACK indication message includes at least one of a CID of the MS, BSN information of data for the RS retransmission, ACK type, and ACK MAP information.

9. The retransmission method of claim 7, wherein the ACK/NACK indication message includes at least one of a CID of the MS, Hybrid Automatic Retransmission reQuest (HARQ) Channel ID (ACID) information indicative of a unique number of a HARQ data channel to represent unique sequence values of data blocks to be retransmitted, Sub Packet ID (SPID) information indicative of unique numbers of sub data blocks in the ACID, ACK type, and ACK MAP information.

10. The retransmission method of claim 1, wherein retransmitting the data to the MS comprises:
checking data corresponding to the NACK indication message when the NACK indication message is received from the BS; and
retransmitting the data to the MS according to scheduling by the BS.

11. The retransmission method of claim 10, wherein the NACK indication message includes at least one of a CID of the MS, and BSN information of the data for the RS retransmission.

12. The retransmission method of claim 10, wherein the NACK indication message includes at least one of a CID of the MS, ACID information indicative of a unique number of a HARQ data channel to represent unique sequence values of data blocks to be retransmitted, and SPID information indicative of unique numbers of sub data blocks in the ACID.

13. The retransmission method of claim 1, further comprising:
discarding a corresponding data when transmission of the data to the MS is not completed until a lifetime expires.

14. A retransmission method of a Relay Station (RS) in a wireless relay communication system, the method comprising:
receiving data from a Base Station (BS),
storing the data if the RS receives the data correctly;
checking if a Mobile Station (MS) receives the data correctly by listening to a NACK transmitted directly from the MS to the BS; and
transmitting the data to the MS according to scheduling by the BS.

15. The retransmission method of claim 14, further comprising
transmitting to the BS a reception success message for the correctly received data.

16. The retransmission method of claim 14, further comprising requesting retransmission of data having errors to the BS.

17. The retransmission method of claim 16, wherein the requesting the retransmission to the BS step comprises:
generating a retransmission request message including at least one of a Connection IDentifier (CID) of the RS, Acknowledgement (ACK) type between the BS and the RS, Block Sequence Number (BSN) between the BS and the RS, and ACK MAP information; and
transmitting the retransmission request message to the BS.

18. The retransmission method of claim 14, further comprising:
discarding a corresponding data when the data transmission to the MS is not completed until a lifetime of the data expires.

19. A Relay Station (RS) in a wireless relay communication system, comprising:
a receiver for receiving data from a Base Station (BS) or Mobile Station (MS),
a checker for checking whether the data is corrupted or not;
a buffer for storing correctly received data; and
a transmitter for transmitting the data correctly to an MS according to scheduling by the BS, and retransmitting data corresponding to a NACK to the MS according to scheduling information received from the BS when the BS receives the NACK directly from the MS.

20. The RS of claim 19, wherein the transmitter generates data in a same form as the data received from the BS and transmits the generated data to the MS.

21. The RS of claim 19, wherein the transmitter transmits to a Base Station (BS) a reception success message for the correctly received data and a retransmission request message with respect to corrupted data.

22. The RS of claim 19, further comprising:
an Automatic Retransmission reQuest (ARQ) controller which controls a retransmission request to the BS with respect to the corrupted data, and controls to retransmit data corresponding to the NACK to the MS when the scheduling information is received from the BS.

23. The RS of claim 22, wherein the ARQ controller controls to read and retransmit data corresponding to the NACK from the buffer to the MS when scheduling information is received from the BS, and
the ARQ controller controls to discard data corresponding to ACK from the buffer.

24. The RS of claim 19, further comprising:
an ARQ timer which manages a lifetime of each data transmitted to the MS,
wherein the ARQ controller discards data which is not completely transmitted until the lifetimer expires, from the buffer.

25. A Relay Station (RS) in a wireless relay communication system, comprising:
means for receiving data from a Base Station (BS);
means for storing the data if the RS receives the data correctly;
means for transmitting the data to a Mobile Station (MS) according to scheduling by the BS;
means for receiving scheduling information from the BS in order to retransmit the data when the BS receives a NACK directly from the MS; and
means for retransmitting the data to the MS according to the scheduling information.

26. A Relay Station (RS) in a wireless relay communication system, comprising:
means for receiving data from a Base Station (BS);
means for storing the data if the RS receives the data correctly;
means for checking if a Mobile Station (MS) receives the data correctly by listening to a NACK transmitted directly from the MS to the BS; and
means for transmitting the data to the MS according to scheduling by the BS.

* * * * *